(12) United States Patent
Chen

(10) Patent No.: US 11,900,613 B2
(45) Date of Patent: Feb. 13, 2024

(54) IMAGE SEGMENTATION METHOD AND APPARATUS, MODEL TRAINING METHOD AND APPARATUS, DEVICE, AND STORAGE MEDIUM

(71) Applicant: TENCENT TECHNOLOGY (SHENZHEN) COMPANY LIMITED, Shenzhen (CN)

(72) Inventor: Sihong Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 287 days.

(21) Appl. No.: 17/395,388

(22) Filed: Aug. 5, 2021

(65) Prior Publication Data

US 2021/0366126 A1    Nov. 25, 2021

Related U.S. Application Data

(63) Continuation of application No. PCT/CN2020/092356, filed on May 26, 2020.

(30) Foreign Application Priority Data

May 29, 2019    (CN) .......................... 201910455150.4

(51) Int. Cl.
*G06N 3/045*    (2023.01)
*G06T 7/174*    (2017.01)
(Continued)

(52) U.S. Cl.
CPC ............. *G06T 7/174* (2017.01); *G06N 3/045* (2023.01); *G06N 3/08* (2013.01); *G06T 3/0006* (2013.01);
(Continued)

(58) Field of Classification Search
CPC ..................................................... G06T 7/174
See application file for complete search history.

(56) References Cited

U.S. PATENT DOCUMENTS

2006/0060308 A1    3/2006    LeBlanc et al.
2009/0074071 A1    3/2009    Nagumo et al.
(Continued)

FOREIGN PATENT DOCUMENTS

CN    101383966 A    3/2009
CN    101482923 A    7/2009
(Continued)

OTHER PUBLICATIONS

The World Intellectual Property Organization (WIPO) International Search Report for PCT/CN2020/092356 dated Aug. 18, 2020 5 Pages (including translation).
(Continued)

*Primary Examiner* — Oneal R Mistry
(74) *Attorney, Agent, or Firm* — ANOVA LAW GROUP PLLC

(57) ABSTRACT

This application relates to an image segmentation method and apparatus. The method includes obtaining a current frame and historical affine transformation information transmitted by a previous video frame in a video frame sequence; performing affine transformation on the current frame according to the historical affine transformation information to obtain a candidate region image corresponding to the current frame; performing feature extraction on the candidate region image to obtain a feature map corresponding to the candidate region image; performing semantic segmentation based on the feature map to obtain a segmentation result corresponding to a target in the current frame; and revising the historical affine transformation information according to the feature map to obtain updated affine transformation information, and using the updated affine trans-
(Continued)

formation information as historical affine transformation information corresponding to a subsequent video frame in the video frame sequence.

20 Claims, 11 Drawing Sheets

(51) Int. Cl.
  *G06N 3/08* (2023.01)
  *G06T 3/00* (2006.01)
  *G06T 3/40* (2006.01)
(52) U.S. Cl.
  CPC .. *G06T 3/4046* (2013.01); *G06T 2207/10016* (2013.01); *G06T 2207/20224* (2013.01)

(56) References Cited

U.S. PATENT DOCUMENTS

| | | | |
|---|---|---|---|
| 2011/0254950 A1 | 10/2011 | Bibby et al. | |
| 2014/0132786 A1* | 5/2014 | Saitwal | H04N 23/6811 348/208.99 |
| 2014/0254882 A1* | 9/2014 | Jin | G06T 7/215 382/107 |
| 2016/0143576 A1 | 5/2016 | Symon et al. | |
| 2018/0315199 A1* | 11/2018 | Socek | G06T 7/207 |

FOREIGN PATENT DOCUMENTS

| | | | |
|---|---|---|---|
| CN | 101719279 | A | 6/2010 |
| CN | 102216957 | A | 10/2011 |
| CN | 102456225 | A | 5/2012 |
| CN | 102740096 | A | 10/2012 |
| CN | 107146239 | A | 9/2017 |
| CN | 108122234 | A | 6/2018 |
| CN | 108492297 | A | 9/2018 |
| CN | 108596184 | A | 9/2018 |
| CN | 110188754 | A | 8/2019 |

OTHER PUBLICATIONS

The State Intellectual Property Office of the People's Republic of China (SIPO) Office Action 1 for for 201910455150.4 dated Oct. 30, 2020 7 Pages (including translation).
Dahun Kim et al., "Deep Video Inpainting," arXiv:1905.01639, May 5, 2019. 10 pages.
Sihong Chen et al., "TAN: Temporal Affine Network for Real-Time Left Ventricle Anatomical Structure Analysis Based on 2D Ultrasound Videos," arXiv:1904.00631, Apr. 1, 2019. 11 pages.

* cited by examiner

IMAGE SEGMENTATION METHOD AND APPARATUS, MODEL TRAINING METHOD AND APPARATUS, DEVICE, AND STORAGE MEDIUM

RELATED APPLICATIONS

This application is a continuation application of PCT Application No. PCT/CN2020/092356, entitled "IMAGE SEGMENTATION METHOD, MODEL TRAINING METHOD, APPARATUSES, DEVICE AND STORAGE MEDIUM" and filed on May 26, 2020, which in turn claims priority to Chinese Patent Application No. 201910455150.4, entitled "IMAGE SEGMENTATION METHOD AND APPARATUS, AND MODEL TRAINING METHOD AND APPARATUS" and filed on May 29, 2019. The two applications are incorporated by reference in their entirety.

FIELD OF THE TECHNOLOGY

This application relates to the field of computer technologies, and in particular, to an image segmentation method and apparatus and a model training method and apparatus.

BACKGROUND OF THE DISCLOSURE

Semantic segmentation performed on images or videos is one of hotspots in the field of computer vision research. The semantic segmentation technology refers to a computer device segmenting a picture to obtain all regions belonging to a major category and provides category information of the regions.

In a method for performing semantic segmentation on a video in the related art, a computer device needs to perform key point prediction on each frame of the video to obtain key points of each frame. Using a template, the computer device calculates a difference between each frame of image and the template according to the key points of each frame to obtain a transformation parameter, performs affine transformation based on the transformation parameter to identify a region of interest (ROI), and then performs target segmentation on the ROI.

However, in the foregoing semantic segmentation method, key point prediction of a subsequent video frame depends on a target segmentation result of a previous video frame. A prediction deviation of the first frame directly causes the positioning offset of a series of subsequent video frames, resulting in low accuracy of semantic segmentation of a target object.

SUMMARY

This application provides an image segmentation method and apparatus, a model training method and apparatus, a device, and a storage medium, which can improve the accuracy of semantic segmentation.

One aspect of the present disclosure provides an image segmentation method applicable to a computer device. The method includes obtaining a current frame and historical affine transformation information of a previous video frame in a video frame sequence; performing affine transformation on the current frame according to the historical affine transformation information to obtain a candidate region image corresponding to the current frame; performing feature extraction on the candidate region image to obtain a feature map corresponding to the candidate region image; performing semantic segmentation based on the feature map to obtain a segmentation result corresponding to a target in the current frame; and revising the historical affine transformation information according to the feature map to obtain updated affine transformation information, and using the updated affine transformation information as historical affine transformation information corresponding to a subsequent video frame in the video frame sequence.

Another aspect of the present disclosure provides a model training method applicable to a computer device. The method includes obtaining a video frame sample, sample annotation information corresponding to the video frame sample, and standard affine transformation information corresponding to the video frame sample; inputting the video frame sample into a target segmentation model for training, and determining predicted affine transformation information corresponding to the video frame sample by using the target segmentation model; constructing an affine loss function according to the predicted affine transformation information and the standard affine transformation information; outputting predicted affine transformation difference information corresponding to the video frame sample and a predicted segmentation result corresponding to a target in the video frame sample by using the target segmentation model; determining standard affine transformation difference information according to a difference between the predicted affine transformation information and the standard affine transformation information; constructing an affine transformation information revision loss function according to the standard affine transformation difference information and the predicted affine transformation difference information; determining a segmentation loss function according to the predicted segmentation result and the sample annotation information; and adjusting, according to the affine loss function, the affine transformation information revision loss function, and the segmentation loss function, model parameters of the target segmentation model and continuing training the model until a training stop condition is met.

Another aspect of this disclosure provides a non-transitory computer-readable storage medium, storing a computer program, the computer program, when executed by a processor, causing the processor to perform the following steps: obtaining a current frame and historical affine transformation information of a previous video frame in a video frame sequence; performing affine transformation on the current frame according to the historical affine transformation information to obtain a candidate region image corresponding to the current frame; performing feature extraction on the candidate region image to obtain a feature map corresponding to the candidate region image; performing semantic segmentation based on the feature map to obtain a segmentation result corresponding to a target in the current frame; and revising the historical affine transformation information according to the feature map to obtain updated affine transformation information, and using the updated affine transformation information as historical affine transformation information corresponding to a subsequent video frame in the video frame sequence.

Another aspect of this disclosure provides an image segmentation apparatus. The apparatus includes an obtaining module, configured to obtain a current frame and historical affine transformation information of a previous video frame in a video frame sequence; an affine transformation module, configured to perform affine transformation on the current frame according to the historical affine transformation information to obtain a candidate region image corresponding to the current frame; a feature extraction module, configured to perform feature extraction on the candidate region image to obtain a feature map corresponding to the candidate region image; a semantic segmentation module, configured to perform semantic segmentation based on the feature map to obtain a segmentation result corresponding to a target in the current frame; and a parameter revision module, configured to revise the historical affine transformation information according to the feature map to obtain updated affine transformation information, and use the updated affine transformation information as historical affine transformation information corresponding to a subsequent video frame in the video frame sequence.

According to an aspect of this application, a computer device is provided, including a memory and a processor, the memory storing a computer program, the computer program, when executed by the processor, causing the processor to perform the following steps: obtaining a current frame and historical affine transformation information of a previous video frame in a video frame sequence; performing affine transformation on the current frame according to the historical affine transformation information to obtain a candidate region image corresponding to the current frame; performing feature extraction on the candidate region image to obtain a feature map corresponding to the candidate region image; performing semantic segmentation based on the feature map to obtain a segmentation result corresponding to a target in the current frame; and revising the historical affine transformation information according to the feature map to obtain updated affine transformation information, and using the updated affine transformation information as historical affine transformation information corresponding to a subsequent video frame in the video frame sequence.

According to the foregoing image segmentation method and apparatus, computer-readable storage medium, and computer device, affine transformation is performed on a current frame according to historical affine transformation information of a previous video frame to obtain a candidate region image corresponding to the current frame. The historical affine transformation information of the previous video frame are revised parameters, which can greatly improve the accuracy of the obtaining of the candidate region image. Semantic segmentation is performed on a feature map corresponding to the candidate region image, so that a segmentation result corresponding to a target in the current frame can be accurately obtained. In addition, the historical affine transformation information is revised according to the feature map, and the revised affine transformation information is transmitted to a subsequent video frame for use in the subsequent video frame. Accordingly, the positioning of the current frame can be revised, thereby reducing the error in the subsequent segmentation processing caused by wrong positioning, to greatly improve the accuracy of the semantic segmentation of a video.

According to the foregoing model training method and apparatus, computer-readable storage medium, and computer device, in the model training process, affine transformation control information, that is, standard affine transformation information, is introduced to improve the accuracy of orientation prediction. In addition, revision training can be performed on predicted affine transformation information to reduce the segmentation error caused by incorrect positioning. In the training, an affine loss function, an affine transformation information revision loss function, and a segmentation loss function are superimposed and optimized together, so that various parts improve each other in the training process. As a result, the target segmentation model obtained by training has accurate video semantic segmentation performance.

DESCRIPTION OF EMBODIMENTS

To make the objectives, technical solutions, and advantages of this application clearer, the following further describes this application in detail with reference to the accompanying drawings and the embodiments. The specific embodiments described herein are merely used to explain this application but are not intended to limit this application.

Figure 1:
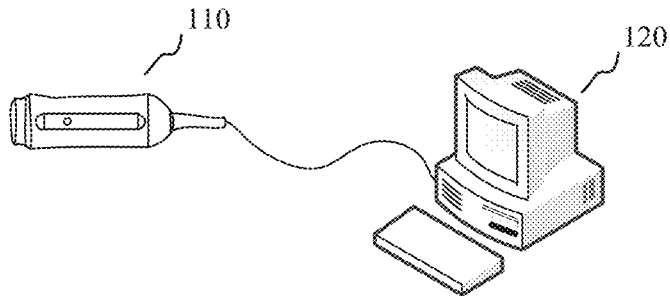
FIG. 1 is a diagram of an application environment of an image segmentation method and/or model training method according to an embodiment.

FIG. 1 is a diagram of an application environment of an image segmentation method and/or model training method according to an embodiment. Referring to FIG. 1, the image segmentation method and/or model training method is applicable to a semantic segmentation system. The semantic segmentation system includes an acquisition device 110 and a computer device 120. The acquisition device 110 and the computer device 120 may be connected via a network or a transmission cable. The computer device 120 may be a terminal or a server. The terminal may be a desktop terminal or a mobile terminal, and the mobile terminal may be one of a mobile phone, a tablet computer, a notebook computer, and the like. The server may be implemented by using an independent server or a server cluster including a plurality of servers.

The acquisition device 110 may acquire a video in real time and transmit the video to the computer device 120. The computer device 120 may obtain a current frame and historical affine transformation information transmitted by a previous video frame in a video frame sequence; perform affine transformation on the current frame according to the historical affine transformation information to obtain a candidate region image corresponding to the current frame; perform feature extraction on the candidate region image to obtain a feature map corresponding to the candidate region image; perform semantic segmentation based on the feature map to obtain a segmentation result corresponding to a target in the current frame; and revise the historical affine transformation information according to the feature map to obtain updated affine transformation information, and use the updated affine transformation information as historical affine transformation information corresponding to a subsequent video frame in the video frame sequence.

The foregoing application environment is only an example, and in some embodiments, the computer device 120 may directly obtain a video and perform target segmentation on each video frame in a video frame sequence corresponding to the video according to the foregoing steps.

Figure 2:
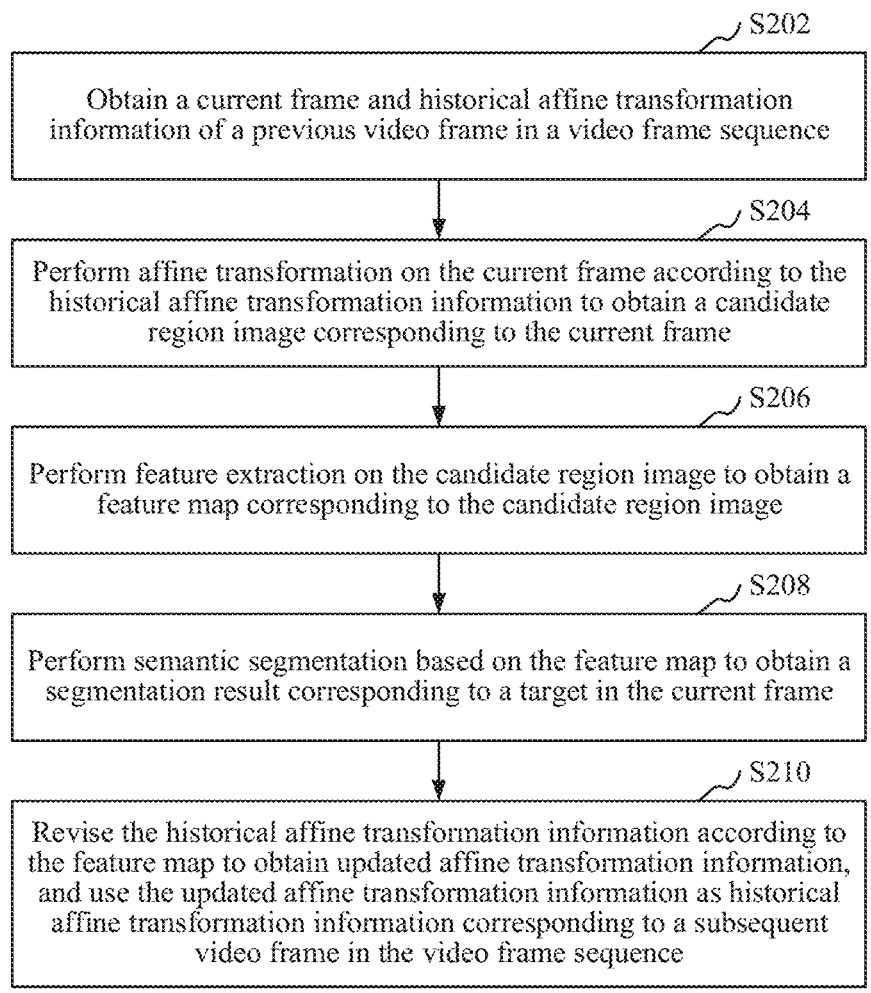
FIG. 2 is a schematic flowchart of an image segmentation method according to an embodiment.

As shown in FIG. 2, in an embodiment, an image segmentation method is provided. In this embodiment, description is made by using an example in which the method is applicable to the computer device 120 in FIG. 1. Referring to FIG. 2, the image segmentation method includes the following steps:

S202: Obtain a current frame and historical affine transformation information of a previous video frame in a video frame sequence.

The video frame sequence is a sequence composed of more than one video frame according to a generation sequence corresponding to each video frame. The video frame sequence includes a plurality of video frames arranged according to the generation sequence. A video frame is a basic unit forming a video, and one video may include a plurality of video frames. The video frame sequence may be a sequence composed of video frames acquired in real time. For example, the video frame sequence may be a video frame sequence obtained in real time by a camera of an acquisition device, or a video frame sequence corresponding to a stored video.

The current frame is a video frame that is being processed, such as an frame. The previous video frame is a video frame whose generation time point is before that of the current frame. The previous video frame may be the nearest video frame before the current frame or a video frame that is a few frames away from and before the current frame, and may also be referred to as a historical video frame of the current frame.

The historical affine transformation information is affine transformation information transmitted by a previous video frame and used for affine transformation of a current frame. The "transmitted by a previous video frame" can be understood as: transmitted by a computer device according to the previous video frame, or corresponding to the previous video frame. The affine transformation, also known as affine mapping, is a process of performing linear transformation on a spatial vector matrix and then performing translation transformation to obtain another spatial vector matrix. The linear transformation includes a convolution operation. The affine transformation information is information required for performing affine transformation, and may be affine transformation parameters or instructions for instructing how to perform affine transformation. Affine transformation parameters refer to reference parameters needed in linear transformation or translation transformation of an image, such as an angle of rotation (angle), a translation pixel in a horizontal axis ($Shift_x$), a translation pixel in a vertical axis ($Shift_y$), a scale factor (scale), and other information.

The computer device can obtain a current frame and historical affine transformation information of a previous video frame in the process of detecting the video. The historical affine transformation information of the previous video frame refers to parameters that are obtained when the image segmentation method is performed on the previous video frame, have been revised, and are used for affine transformation of the current frame. The computer device can obtain the historical affine transformation information in the following way: when the computer device performs target segmentation on the previous video frame, the computer device can revise the affine transformation information corresponding to the previous video frame according to a feature map corresponding to the previous video frame to obtain updated affine transformation information. The updated affine transformation information can be used as historical affine transformation information of the current frame.

It may be understood that in the process of performing target segmentation on the whole video frame sequence, when the computer device performs the image segmentation method on the current frame, the computer device can similarly revise the historical affine transformation information according to the feature map of the current frame to obtain updated affine transformation information, and use the updated affine transformation information as historical affine transformation information corresponding to a subsequent video frame in the video frame sequence. Accordingly, when target segmentation is performed on the video frame sequence, the affine transformation information can be continuously revised and transmitted. The positioning of the current frame can be revised, thereby reducing the error in the subsequent segmentation processing caused by wrong positioning, to improve the accuracy of the semantic segmentation of a video.

It may be understood that, the "current frame" used in this application is used for describing a video frame processed in this method, and the "current frame" is a video frame relative to the current process. For example, when a next video frame of the current frame is processed, the next video frame may be referred to as a new "current frame".

In an embodiment, the computer device may use historical affine transformation information transmitted by the previous frame of the current frame as affine transformation information corresponding to the current frame to perform affine transformation. Correspondingly, the next video frame may use the historical affine transformation information transmitted by the current frame as affine transformation information corresponding to the next frame. By analogy, each video frame can use historical affine transformation information transmitted by the previous frame as affine transformation information corresponding to each frame to perform affine transformation.

It may be understood that in some other embodiments, the computer device may further use historical affine transformation information transmitted by the previous $N^{th}$ frame (N is a positive integer and N is greater than 1) of the current frame as affine transformation information corresponding to the current frame to perform affine transformation. Correspondingly, the next video frame may use the historical affine transformation information transmitted by the previous $(N-1)^{th}$ frame of the current frame as affine transformation information corresponding to the next frame. By analogy, each video frame can use historical affine transformation information transmitted by the previous $N^{th}$ frame as affine transformation information corresponding to each frame to perform affine transformation.

Figure 3:
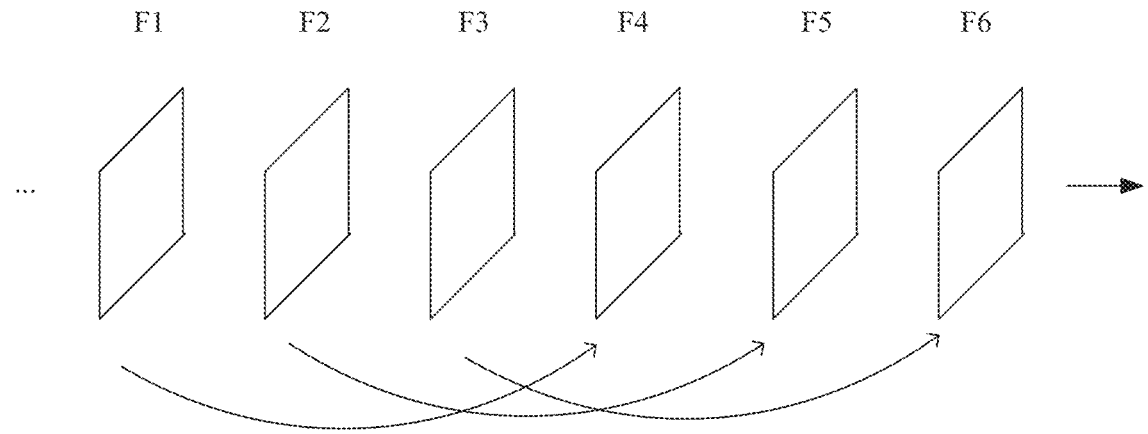
FIG. 3 is a schematic structural diagram of a video frame sequence according to an embodiment.
Figure 4:
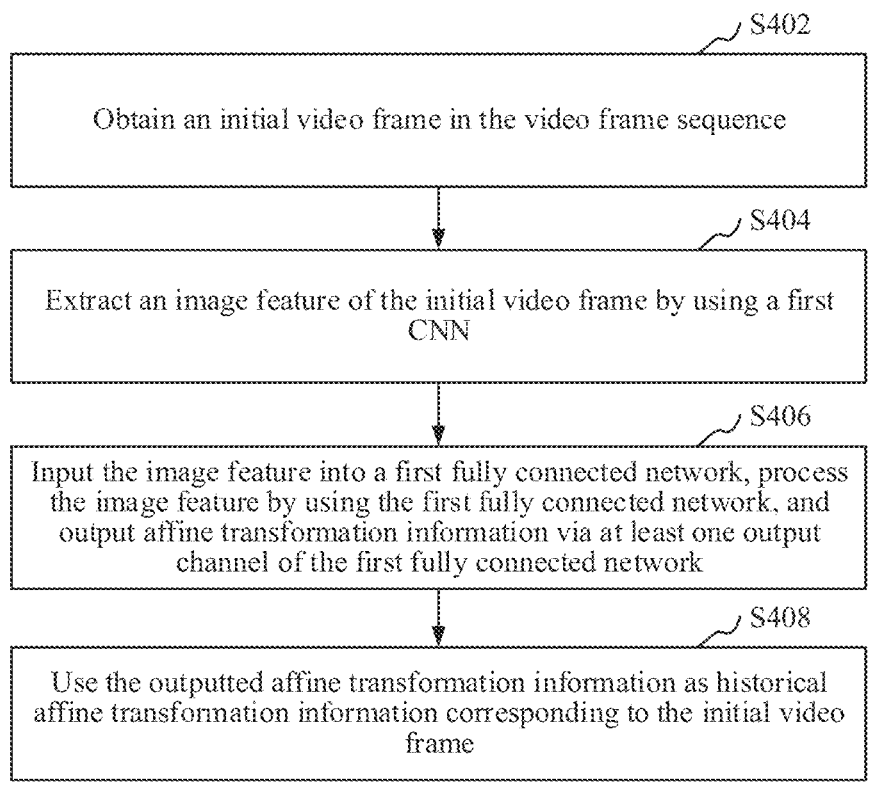
FIG. 4 is a schematic flowchart of steps of obtaining a current frame and historical affine transformation information transmitted by a previous video frame in a video frame sequence according to an embodiment.

For example, referring to FIG. 3, for a video frame sequence [F1, F2, F3, F4, F5, F6], if a current frame that is being processed by the computer device is F4, the current frame F4 may use historical affine transformation information transmitted by a previous video frame F1 as corresponding affine transformation information to perform affine transformation; a video frame F5 may use historical affine transformation information transmitted by a previous video frame F2 as corresponding affine transformation information to perform affine transformation; and a video frame F6 may use historical affine transformation information transmitted by a previous video frame F3 as corresponding affine transformation information to perform affine transformation, and the rest is deduced by analogy.

In an embodiment, if a current frame is an initial video frame, step S202, that is, the step of obtaining a current frame and historical affine transformation information of a previous video frame in a video frame sequence includes the following steps:

S402. Obtain an initial video frame in the video frame sequence.

The initial video frame is the preliminary video frame in the video frame sequence. The initial video frame may be the first video frame in the video frame sequence, or the Nth frame in the video frame sequence (for example, the first frame where the focusing stability reaches a preset condition, or the first frame where a target appears), or the first N (N is a positive integer, and N is greater than 1) video frames in the video frame sequence.

It may be understood that when the computer device is performing the image segmentation method, and for affine transformation information of each subsequent video frame, reference is made to affine transformation information of a previous video frame, the initial video frame is the first video frame in the video frame sequence. When the computer device is performing the image segmentation method and the computer device uses historical affine transformation information transmitted by the previous Nth (N is a positive integer, and N is greater than 1) frame of the current frame as affine transformation information corresponding to the current frame, video frames from the first frame to the previous Nth frame of the video frame sequence can all be referred to as initial video frames.

S404: Extract an image feature of the initial video frame by using a first convolutional neural network (CNN).

A CNN is a type of feedforward neural network that includes convolution calculations and has a deep structure. The sharing of convolution kernel parameters in a hidden layer and the specific sparsity of inter-layer connections in the CNN enable the CNN to learn grid features (such as pixels and audio) with a small amount of calculation. The CNN usually includes a convolution layer and a pooling layer, which can perform convolution and pooling on an input image to map original data to a hidden layer feature space. An image feature is a spatial vector matrix that can represent image information of an initial video frame that is obtained after processing is performed by a CNN.

In some embodiments, the image segmentation method is performed by using a target segmentation model. The computer device may input a video frame sequence into the target segmentation model, process an initial video frame by using a first CNN in the target segmentation model, extract features in the initial video frame, and obtain a corresponding image feature. S406: Input the image feature into a first fully connected network, process the image feature by using the first fully connected network, and output affine transformation information via at least one output channel of the first fully connected network.

The fully connected network may also be known as fully connected (FC) layers functioning as a "classifier" in a whole CNN. The FC layer can map an image feature learned by a convolution layer and a pooling layer to a sample annotation space.

In some embodiments, the computer device may input the image feature into a first fully connected network, process the image feature by using the first fully connected network, and output affine transformation information via at least one output channel of the first fully connected network.

In an embodiment, the target segmentation model includes a region affine network (RAN), and the RAN includes a CNN and a fully connected network. In some embodiments, the computer device inputs an initial video frame in the video frame sequence into the RAN, extracts an image feature of the initial video frame by using a lightweight MobileNet-V2 network (lightweight network) as a generator, and obtains 4 affine transformation parameters by regression using a fully connected network with an output channel of 4. The 4 parameters are an angle of rotation, a translation pixel in a horizontal axis, a translation pixel in a vertical axis, and a scale factor.

S408: Use the outputted affine transformation information as historical affine transformation information corresponding to the initial video frame.

In some embodiments, the computer device can use the affine transformation information outputted by the first fully connected network as the affine transformation information corresponding to the initial video frame, and perform affine transformation according to the affine transformation information to obtain the candidate region image corresponding to the initial video frame.

It may be understood that for the initial video frame, the initial video frame does not have a corresponding previous video frame for reference. Therefore, there is no historical affine transformation information of the previous video frame that can be used by the initial video frame.

In an embodiment, when the target segmentation model is trained, control information corresponding to the affine transformation information can be introduced as a training sample for model training. The control information corresponding to the affine transformation may be standard affine transformation information corresponding to a video frame sample. The standard affine transformation information refers to affine transformation information needed in converting the video frame sample into a template. The standard affine transformation information can be obtained by calculating a reflection similarity between sample key point position information included in the video frame sample and template key point position information included in the template. How the template is obtained, and the training process of the target segmentation model are described in detail in the subsequent model training method.

Accordingly, introducing the control information corresponding to the affine transformation information to train the target segmentation model can make the RAN in the target segmentation model learn information about the template, so that the affine transformation information of the initial video frame relative to the template can be accurately obtained by regression.

In the foregoing embodiments, the image feature of the initial video frame is extracted by using the CNN, and the image features are processed by using the first fully connected network. The affine transformation information corresponding to the initial video frame and with higher accuracy can be predicted, thereby helping improve the accuracy of target segmentation in subsequent processing.

In an embodiment, when the current frame is not the initial video frame, historical affine transformation information of the previous video frame is read from a cache.

S204: Perform affine transformation on the current frame according to the historical affine transformation information to obtain a candidate region image corresponding to the current frame.

In some embodiments, that the computer device performs affine transformation on the current frame according to the historical affine transformation information may be that the computer device revises the position, size, and orientation corresponding to a target in the current frame to obtain the corresponding candidate region image. The candidate region image may also be referred to as a region of interest (ROI).

In an embodiment, the computer device may input the video frame sequence into a target segmentation network, and perform the image segmentation method by using the target segmentation model. The target segmentation model is a model used for semantic segmentation of a target object in a video, and may be a machine learning model. The target segmentation model may include a plurality of network structures. Different network structures include model parameters corresponding to their respective networks. Different network structures are used for performing different actions.

In an embodiment, the computer device can input the video frame sequence into a target segmentation model, and perform affine transformation on the current frame according to the historical affine transformation information via a RAN included in the target segmentation model to obtain a candidate region image corresponding to the current frame.

S206: Perform feature extraction on the candidate region image to obtain a feature map corresponding to the candidate region image.

The feature map is a spatial vector matrix obtained by convolution and/or pooling of an image by using a CNN, and can be used to represent image information of the image. In some embodiments, the computer device may perform feature extraction on the candidate region image to obtain a feature map corresponding to the candidate region image.

In an embodiment, the computer device may perform feature extraction on the candidate region image by using a second CNN in the target segmentation model to obtain the feature map corresponding to the candidate region image. The CNN may be a MobileNet-V2, a visual geometry group (VGG) network, a deep residual learning (ResNet) network, or the like.

A second CNN and a first CNN can share parameters between each other, so that the two can be considered as the same CNN. The "first" and "second" herein are mainly used to distinguish CNNs that are at different positions in the target segmentation model and are used to process different data.

In an embodiment, the feature map obtained by performing feature extraction on a candidate region image fuses with optical flow information contained in the video frame sequence.

The optical flow information is motion change information of an image. In the embodiments of this application, optical flow information can be used to indicate motion information of each pixel in a video frame sequence in video frames, including motion change information of a to-be-detected target in a video image. In the embodiments of this application, optical flow information corresponding to a previous video frame can be determined by a position corresponding to each pixel in the previous video frame and a position corresponding to each pixel in a current frame.

In an embodiment, it may be supposed that corresponding changes in a target in two adjacent video frames are relatively minor, so that a target segmentation region where a target object is located in the current frame can be determined by optical flow information corresponding to the previous video frame. For example, the target segmentation region where the target object is located in the current frame can be jointly predicted based on the optical flow information and the target segmentation region where the target object is located in the previous video frame.

To enable the CNN in the target segmentation model to fuse with corresponding optical flow information when the CNN performs feature extraction on the candidate region image, to make the extracted feature map fuse with the optical flow information, a discriminator can be introduced for joint training when the CNN in the target segmentation model is trained. The generator and the discriminator together form a generative adversarial network (GAN).

In the model training stage, there are two feature forms for the feature map corresponding to the current frame: one is a feature map extracted by the second CNN based on the candidate region image corresponding to the current frame, being referred to as a CNN feature; the other is a feature map obtained by transforming the feature map of the previous video frame based on the optical flow information, being referred to as an optical flow feature. For this reason, a discriminator can be designed to introduce the two types of information at the same time. That is to say, in the model training process, either of the CNN feature and the optical flow feature can be inputted into the discriminator. The discriminator determines whether the current inputted feature is an optical flow feature or a CNN feature. Since parameters of the second CNN and parameters of the discriminator are continuously adjusted, the discriminator cannot distinguish the difference between the CNN feature and the optical flow feature. In this case, the second CNN can generate a feature map fusing with optical flow information. A more detailed training process between the discriminator and the second CNN will be described in detail in the embodiments of the subsequent model training stage.

In the foregoing embodiment, the feature map obtained by performing feature extraction on the candidate region image fuses with the optical flow information contained in the video frame sequence, which can avoid errors in the segmentation result, so as to produce a proper segmentation result with sequence progressivity.

S208: Perform semantic segmentation based on the feature map to obtain a segmentation result corresponding to a target in the current frame.

Semantic segmentation means that a computer device segments a picture to obtain all regions belonging to a major category and provides category information of the regions. The segmentation result may be a target segmentation region formed by pixels belonging to the target object in the current frame.

In some embodiments, the computer device may detect the feature map in a pixel dimension. That is, based on the feature map corresponding to the candidate region image, each pixel in the candidate region image is detected, and a detection result corresponding to the target in the current frame is outputted. In an embodiment, the computer device can identify categories respectively corresponding to pixels in a candidate region image, and form a target region according to each pixel of a corresponding target category. That is, the target object is distinguished from the candidate region image.

In an embodiment, the computer device may perform semantic segmentation on a candidate region image feature by using a fully convolutional neural network (FCN) in the target segmentation model, and output a detection result corresponding to a target in a current frame.

In an embodiment, step S208, that is, the step of performing semantic segmentation based on the feature map to obtain a segmentation result corresponding to a target in the current frame includes: upsampling the feature map by using an FCN to obtain an intermediate image; performing pixel-level classification on each pixel in the intermediate image by using the FCN to obtain categories corresponding to pixels; and outputting the segmentation result of semantic segmentation on the target in the current frame according to the categories corresponding to the pixels.

The FCN is usually used for performing a pixel-level classification on an input image. Usually, the FCN may upsample a feature map of the last convolution layer by using a deconvolution layer to restore the feature map to the same size as that of the input image. Thus, a prediction is made for each pixel, and spatial information in the initial input image is retained. Finally, pixel-level classification is performed on the upsampled feature map.

The pixel-level refers to a pixel dimension; and pixel-level classification refers to classification processing in the pixel dimension, which is a fine classification method. The pixel-level classification of each pixel in the intermediate image may also be referred to as the pixel-level classification of the intermediate image. The classification is to generate a prediction for each pixel in the intermediate image, and then obtain a category corresponding to each pixel in the intermediate image.

In some embodiments, the computer device may upsample a feature map corresponding to the current frame by using an FCN in the target segmentation model to obtain an intermediate image, and perform pixel-level classification on each pixel in the intermediate image by using the FCN to obtain categories corresponding to pixels. For example, if a category of pixels belonging to a target object in a candidate region image is 1 and a category of pixels not belonging to the target object is 0, a region formed by all pixels of the category 1 in the candidate region image is a target segmentation region. Based on this, a target region can be obtained by segmenting the candidate region image. For example, the target segmentation region can be highlighted in red or green.

In an embodiment, the step of outputting the segmentation result of semantic segmentation on the target in the current frame according to the categories corresponding to the pixels includes determining pixels corresponding to a target category in the intermediate image; and segmenting the intermediate image to obtain a target segmentation region that is composed of the pixels corresponding to the target category and that includes the target object.

In an embodiment, when an FCN of the target segmentation model is trained, the FCN can be trained according to a video frame sample and sample annotation information for annotating the target object in the video frame sample. The trained FCN is capable of classifying pixels. The sample annotation information for annotating the target object in the video frame sample may be annotating pixels corresponding to the target object as "1" and annotating other pixels as "0". Accordingly, the target object is distinguished from a non-target object.

In an embodiment, the computer device can determine pixels corresponding to a target category in an intermediate image by using an FCN in the target segmentation model. Then, the pixels belonging to the target category are annotated, for example, as red or green. Accordingly, a target segmentation region that is composed of the pixels corresponding to the target category and that includes the target object is obtained by segmenting the intermediate image. Accordingly, the target object can be accurately located in the current frame, and the area occupied by the target object in the current frame can be accurately determined.

In an embodiment, the computer device may segment and display a target object in video frames according to a detection result of each video frame, so as to automatically segmenting a target in a video composed of consecutive video frames.

In the foregoing embodiment, the FCN performs pixel-level classification on the feature map to obtain the categories respectively corresponding to the pixels, so that the target segmentation region where the target in the current frame is located can be accurately determined at the pixel level according to the categories corresponding to the pixels, which greatly improves the capability of segmenting the target object.

S210: Revise the historical affine transformation information according to the feature map to obtain updated affine transformation information, and use the updated affine transformation information as historical affine transformation information corresponding to a subsequent video frame in the video frame sequence.

The revising historical affine transformation information is adjusting historical affine transformation parameters to obtain updated affine transformation parameters. In some embodiments, the computer device may revise the historical affine transformation information according to the feature map to obtain updated affine transformation information, and use the updated affine transformation information as historical affine transformation information corresponding to a subsequent video frame in the video frame sequence.

In an embodiment, by using the second fully connected network included in the target segmentation model, the computer device may process the feature map corresponding to the current frame and revise the affine transformation information to obtain updated affine transformation information.

In an embodiment, the second fully connected network included in the target segmentation model can be trained to output an affine transformation difference result, and obtain updated affine transformation information transmitted by the current frame by calculation according to the affine transformation difference result and the historical affine transformation information transmitted by the previous video frame. The computer device can directly transmit the updated affine transformation information to the subsequent video frame for affine transformation of the subsequent video frame.

In an embodiment, step S210, that is, the step of revising the historical affine transformation information according to the feature map to obtain updated affine transformation information, and using the updated affine transformation information as historical affine transformation information corresponding to a subsequent video frame in the video frame sequence includes the following steps: processing the feature map by using a second fully connected network, and outputting an affine transformation difference result via at least one output channel of the second fully connected network; obtaining updated affine transformation information transmitted by the current frame by calculation according to the affine transformation difference result and the historical affine transformation information transmitted by the previous video frame; and using the updated affine transformation information transmitted by the current frame as the historical affine transformation information corresponding to the subsequent video frame in the video frame sequence.

The second fully connected network and the first fully connected network are the same fully connected network, or are different fully connected networks. The same fully connected network means that parameters are shared between the first fully connected network and the second fully connected network; and the different fully connected networks mean that the first fully connected network and the second fully connected network have their respective model parameters.

In some embodiments, the second fully connected network included in the target segmentation model can be trained to output an affine transformation difference result. In this case, the feature map corresponding to the current frame can be processed by using the second fully connected network in the target segmentation model, and the affine transformation difference result can be obtained by regression. In some embodiments, the difference result is a difference rate after normalization.

Further, the computer device may obtain updated affine transformation information transmitted by the current frame by calculation according to the affine transformation difference result and the historical affine transformation information transmitted by the previous video frame. For example, when the affine transformation information is an affine transformation parameter, the computer device can calculate updated affine transformation information by using the following formula:

$$\hat{\theta}_{t+1}' = f(\hat{\theta}_t', \hat{\theta}_t) = \hat{\theta}_t' \times \hat{\theta}_t + \hat{\theta}_t,$$

where $\hat{\theta}_{t+1}$ represents an updated affine transformation parameter transmitted by a current frame; $\hat{\theta}_t'$ represents an affine transformation difference result; and $\hat{\theta}_t$ represents an affine transformation parameter corresponding to the current frame, that is, a historical affine transformation parameter transmitted by a previous video frame.

Furthermore, the computer device may use the updated affine transformation information obtained by calculation as the historical affine transformation information transmitted by the current frame. That is, the updated affine transformation information is transmitted to the subsequent video frame in the video frame sequence, for the subsequent video frame to perform affine transformation according to the updated affine transformation information.

It may be understood that when the second fully connected network included in the target segmentation model is trained to output the affine transformation difference result, control information of the second fully connected network in the training process may be difference information between the standard affine transformation information and the affine transformation information corresponding to the current frame.

In the foregoing embodiment, the feature map is processed by using the second fully connected network to revise the affine transformation information used in the current frame to obtain the updated affine transformation information. The updated affine transformation information is used for back propagation, which can revise the positioning of the current frame and reduce segmentation errors caused by incorrect positioning.

In an embodiment, the second fully connected network included in the target segmentation model may be trained to output revised updated affine transformation information. The computer device can directly transmit the updated affine transformation information to the subsequent video frame for affine transformation of the subsequent video frame.

It may be understood that when the second fully connected network included in the target segmentation model is trained to output revised updated affine transformation information, the control information of the second fully connected network in the training process may be standard affine transformation information corresponding to the current frame.

According to the foregoing image segmentation method, affine transformation is performed on a current frame according to historical affine transformation information transmitted by a previous video frame to obtain a candidate region image corresponding to the current frame. The historical affine transformation information transmitted by the previous video frame are revised parameters, which can greatly improve the accuracy of the obtaining of the candidate region image. Semantic segmentation is performed on a feature map corresponding to the candidate region image, so that a segmentation result corresponding to a target in the current frame can be accurately obtained. In addition, the historical affine transformation information is revised according to the feature map, and the revised affine transformation information is transmitted to a subsequent video frame for use in the subsequent video frame. Accordingly, the positioning of the current frame can be revised, thereby reducing the error in the subsequent segmentation processing caused by wrong positioning, to greatly improve the accuracy of the semantic segmentation of a video.

In an embodiment, the image segmentation method is performed by using a target segmentation model, and the image segmentation method including the following steps: obtaining a current frame and historical affine transformation information of a previous video frame in a video frame sequence; performing affine transformation on the current frame according to the historical affine transformation information by using a RAN in the target segmentation model to obtain a candidate region image corresponding to the current frame; performing feature extraction on the candidate region image by using a second CNN in the target segmentation model to obtain the feature map corresponding to the candidate region image; performing semantic segmentation on the feature map by using an FCN in the target segmentation model to obtain the segmentation result corresponding to the target in the current frame; and revising the historical affine transformation information by using the second fully connected network in the target segmentation model to obtain updated affine transformation information, and using the updated affine transformation information as historical affine transformation information corresponding to a subsequent video frame in the video frame sequence.

Accordingly, by using the trained target segmentation model, the target object can be automatically and accurately obtained by segmenting the video, which has extremely strong real-time performance. In addition, the end-to-end network has a high degree of engineering, is extremely easy to migrate to mobile devices, and is highly adaptive.

Figure 5:
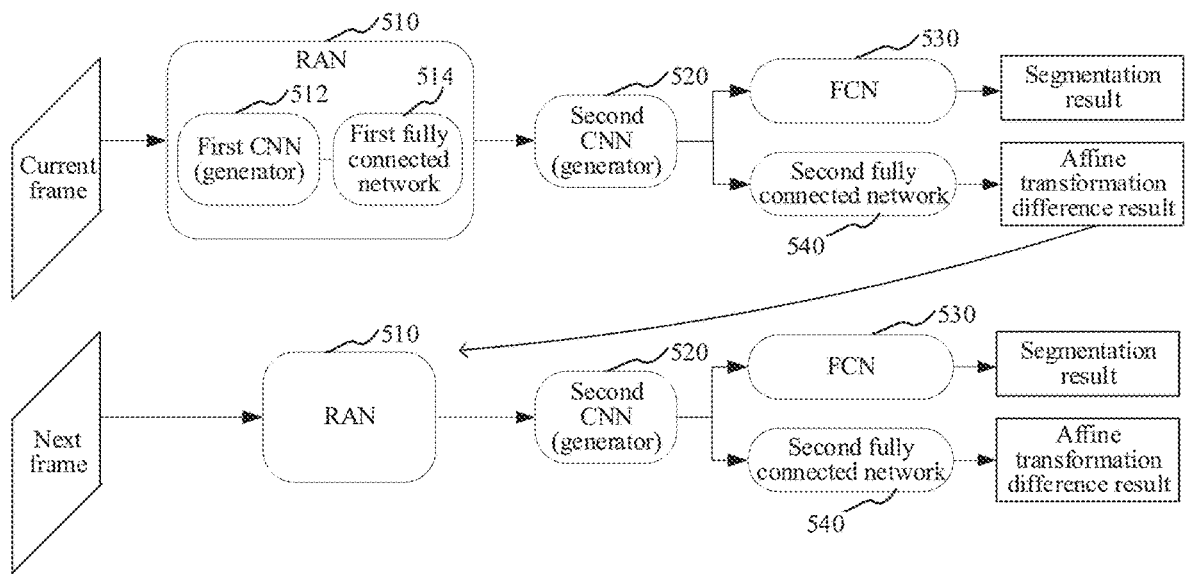
FIG. 5 is an overall framework diagram of a target segmentation model according to an embodiment.

FIG. 5 is an overall framework diagram of a target segmentation model according to an embodiment. Referring to FIG. 5, the overall framework diagram includes a RAN 510, a second CNN (generator) 520, an FCN 530, and a second fully connected network 540. The RAN 510 includes a first CNN (generator) 512 and a first fully connected network 514.

When target segmentation is performed on a target object in a video, video frames in a video frame sequence are inputted frame by frame. If a current frame is an initial video frame, feature extraction is performed on the initial video frame by using the first CNN 512 to obtain an image feature, and the image feature is inputted into the first fully connected network 514 to obtain current affine transformation information by regression. The RAN 510 performs affine transformation on the initial video frame according to the current affine transformation information to obtain a corresponding candidate region image (ROI). Then, feature extraction is performed on the candidate region image by using the second CNN 520 to obtain the feature map corresponding to the candidate region image. The feature map enters two task branches. In a segmentation task branch, a segmentation prediction map is obtained after the upsampling is performed by the FCN 530, and a segmentation result is outputted. In a positioning task branch, the affine transformation difference result is obtained by regression using the second fully connected network. Then, the affine transformation information corresponding to the current frame is revised according to the affine transformation difference result to obtain the updated affine transformation information, and the updated affine transformation information is transmitted to the next frame.

As shown in FIG. 5, in the next video frame, the RAN performs affine transformation on the next video frame according to the updated affine transformation information to obtain an ROI region corresponding to the next video frame. Then, feature extraction is performed on the candidate region image by using the second CNN 520 to obtain a feature map corresponding to the candidate region image. The feature map enters two task branches. In a segmentation task branch, a segmentation prediction map is obtained after the upsampling is performed by the FCN 530, and a segmentation result is outputted. In a positioning task branch, the affine transformation difference result is obtained by regression using the second fully connected network. Then, the affine transformation information corresponding to the next video frame is revised according to the affine transformation difference result to obtain updated affine transformation information, and the updated affine transformation information is transmitted to a subsequent video frame. By analogy, the target in the video is finally segmented.

In an embodiment, the video frame sequence is a test video obtained by performing medical test on biological tissue, for example, an echocardiography video. The target in the video frame is the left ventricle, and a test result is obtaining the left ventricle by segmenting the video frame.

Figure 6:
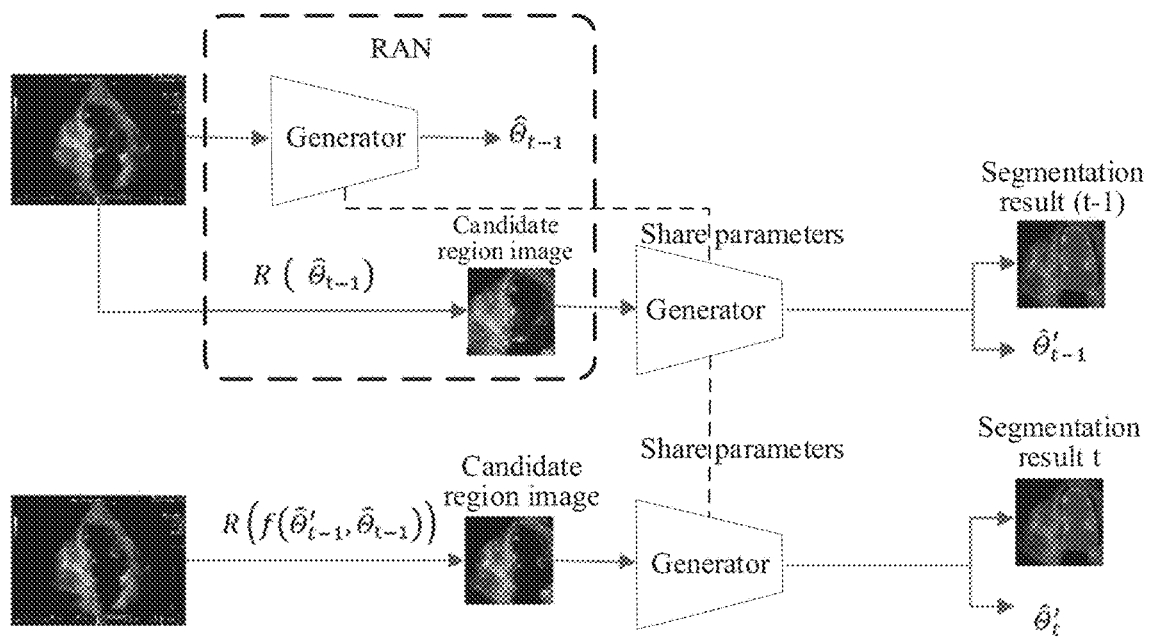
FIG. 6 is a schematic architectural diagram of a target segmentation model that performs target segmentation on a left ventricle in an echocardiography video according to an embodiment.

FIG. 6 is a schematic architectural diagram of target segmentation of a left ventricle in an echocardiography video according to an embodiment. In this schematic diagram, a previous frame is a $(t-1)^{th}$ frame; and a current frame is a $t^{th}$ frame. Referring to FIG. 6, target segmentation is performed on the echocardiography video. For the previous video frame, predicted affine transformation information $\hat{\theta}_{t-1}$ can be generated by using a generator and a fully connected network in a RAN. Then, affine transformation $R(\hat{\theta}_{t-1})$ is performed according to affine transformation information $\hat{\theta}_{t-1}$ to obtain a candidate region image ROI of the previous video frame. Then, an image feature is extracted by using a generator and then enters a segmentation task branch and a positioning task branch respectively to obtain a segmentation result (t−1) and an affine transformation difference parameter $\hat{\theta}_{t-1}'$.

The affine transformation difference parameter is transmitted to the current frame, and the RAN performs affine transformation, such as $R(f(\hat{\theta}_{t-1}', \hat{\theta}_{t-1}))$, on the current frame according to the affine transformation difference parameter $\hat{\theta}_{t-1}'$ and the predicted affine transformation information $\hat{\theta}_{t-1}$ to obtain a candidate region image ROI. Then, an image feature is extracted by using a generator and then enters a segmentation task branch and a positioning task branch respectively to obtain a segmentation result t and an affine transformation difference parameter $\hat{\theta}_t'$. By analogy, the left ventricle in the echocardiography video is annotated and segmented.

Figure 7:
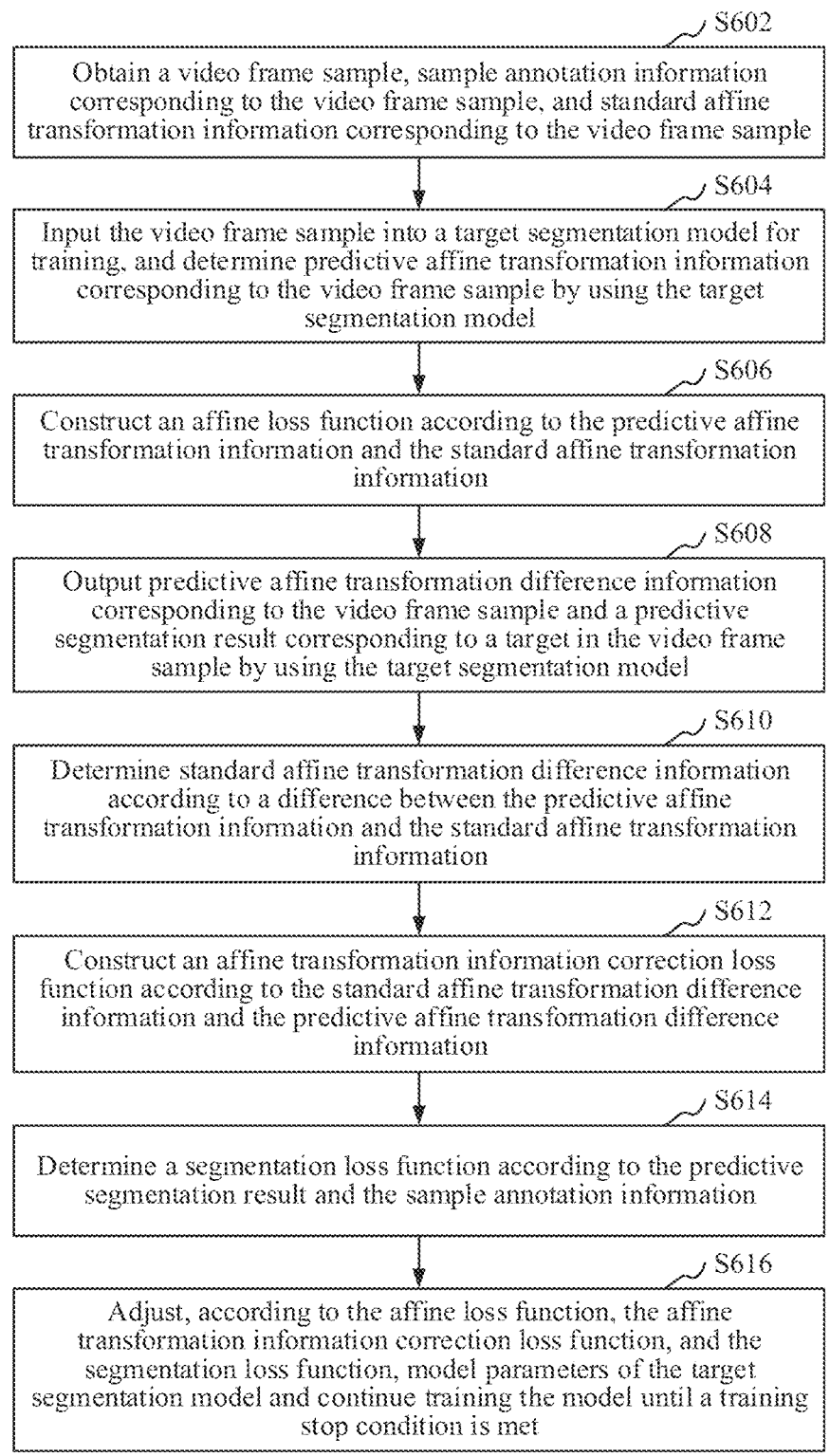
FIG. 7 is a schematic flowchart of training steps of a target segmentation model according to an embodiment.

Referring to FIG. 7, in an embodiment, the image segmentation method is performed by using a target segmentation model, and the training of the target segmentation model including the following steps:

S602: Obtain a video frame sample, sample annotation information corresponding to the video frame sample, and standard affine transformation information corresponding to the video frame sample.

The video frame sample, the sample annotation information corresponding to the video frame sample, and the standard affine transformation information corresponding to the video frame sample are training data. The sample annotation information corresponding to the video frame sample may be sample key point position information for annotating key points in the video frame sample, and sample region position information for annotating a target object in the video frame sample. The key points in the video frame sample are key points used for determining the target object, and the quantity of the key points may be, for example, 3 or 4.

Taking an echocardiography video as an example, the target object in the video frame sequence is the left ventricle. Then, key points in a corresponding video frame sample may be the apex of the left ventricle and both cusps of the left ventricular mitral valve. The sample key point position information may be position information of the apex of the left ventricle and the cusps of the left ventricular mitral valve. The sample region position information may be position information of a region where the left ventricle is located in the video frame sample.

The standard affine transformation information is affine transformation information of the video frame sample relative to the template. That is, the video frame sample can be subjected to affine transformation to obtain the template according to the standard affine transformation information. The template is an image that can represent a standard video frame based on statistics on a plurality of video frame samples.

In an embodiment, step S602, that is, the step of obtaining a video frame sample, sample annotation information corresponding to the video frame sample, and standard affine transformation information corresponding to the video frame sample includes the following steps: obtaining the video frame sample and the corresponding sample annotation information, the sample annotation information including sample key point position information and sample region position information; determining a template image and template key point position information corresponding to the template image according to the video frame sample, the sample key point position information, and the sample region position information; and obtaining the standard affine transformation information corresponding to the video frame sample by calculation according to the sample key point position information and the template key point position information.

In some embodiments, the computer device may obtain the plurality of video frame samples locally or from other computer devices. Then, the computer device annotates the video frame samples manually or automatically to obtain position regions of the sample key points and the target object in the video frame samples.

Then, the computer device can determine the template and template key point position information in the template according to the plurality of video frame samples including the sample annotation information. In some embodiments, the computer device can obtain the template key point position information after averaging the key point position information in the plurality of video frame samples.

For example, the computer device may determine a region box that includes the target object based on the key points in each video frame sample, and expand the region box by a range to obtain an ROI of each video frame sample. Then, the average size of the ROIs corresponding to all video frame samples is calculated, and the ROIs corresponding to all video frame samples are adjusted to the average size. The template can be obtained by averaging all ROI images adjusted to the average size. The template key point position information can be obtained by averaging the key point position information in each ROI image.

Figure 8:
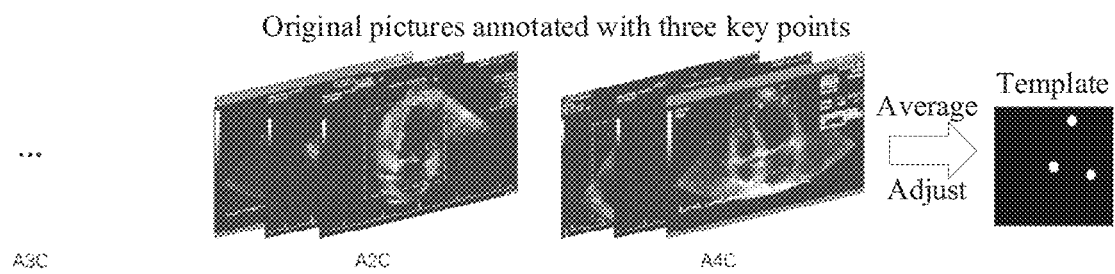
FIG. 8 is a flowchart of obtaining a template according to an embodiment.

The following takes an echocardiography video as an example to describe in detail the steps for obtaining a template in this specification. FIG. 8 is a flowchart of obtaining a template according to an embodiment. As shown in FIG. 8, the computer device may acquire a plurality of standard heart views by using an acquisition device in advance. For example, apical-2-chamber (A2C), apical-3-chamber (A3C), apical-4-chamber (A4C), and apical-5-chamber (A5C) are used as original pictures, that is, as video frame samples. Then, three key points in each view are expanded tightly to obtain a region box. Considering that the left ventricle is in the upper right position in various standard views, to obtain more information about the heart structure, the region box may be expanded leftward and downward by a percentage, such as 50% of the length and width. Finally, a region around the region box is expanded by a percentage based on the box, such as 5% of the length and width, to obtain an ROI of the view. ROIs of all views are adjusted to a size (the size is the average size of all ROIs), and the ROIs of the size are averaged to obtain the template.

Further, the computer device can calculate a reflection similarity according to a size of each video frame sample, key point position information, the size of the template, and the template key point position information to obtain a transformation matrix. The transformation matrix includes affine transformation information. The affine transformation information calculated by using this method is the standard affine transformation information corresponding to the video frame sample.

In the foregoing embodiment, a template image and template key point position information corresponding to the template image can be determined according to the video frame sample, the sample key point position information, and the sample region position information. Thus, each video frame sample can be compared with the template to determine standard affine transformation information. The standard affine transformation information can be used as control information for subsequent model training, so that the target segmentation model can learn information about the template, thereby greatly improving the prediction accuracy of the affine transformation information.

S604: Input the video frame sample into a target segmentation model for training, and determine predicted affine transformation information corresponding to the video frame sample by using the target segmentation model.

In some embodiments, the computer device may input the video frame sample into the target segmentation model, and perform the image segmentation method according to the target segmentation model to obtain predicted affine transformation information corresponding to the video frame sample by using the RAN.

S606: Construct an affine loss function according to the predicted affine transformation information and the standard affine transformation information.

The affine loss function is used for evaluating a degree of difference between the predicted affine transformation information and the standard affine transformation information. The affine loss function assumes the responsibility for training a RAN, so that the RAN in the target segmentation model can generate accurate affine transformation information relative to the template. Accordingly, the introduction of affine control information makes the affine parameter prediction more accurate.

In some embodiments, the computer device may construct the affine loss function according to the predicted affine transformation information and the standard affine transformation information. In an embodiment, the computer device can calculate losses of predicted affine transformation information and standard affine transformation information by using a distance function, such as an L1-Norm (also known as Manhattan distance) function, that is, construct affine loss functions of the predicted affine transformation information and the standard affine transformation information based on the L1-Norm function. It may be understood that in the embodiments of this application, another function may alternatively be used to construct the loss function, as long as the function can be used to measure the degree of difference between the predicted affine transformation information and the standard affine transformation information, such as an L2-Norm (also known as Euclidean distance) function.

S608: Output predicted affine transformation difference information corresponding to the video frame sample and a predicted segmentation result corresponding to a target in the video frame sample by using the target segmentation model.

In some embodiments, the computer device may input the video frame sample into the target segmentation model, perform the image segmentation method according to the target segmentation model, and output the predicted affine transformation difference information corresponding to the video frame sample and the predicted segmentation result corresponding to the target in the video frame sample.

In an embodiment, the computer device may perform affine transformation on the video frame sample according to the predicted affine transformation information by using the RAN in the target segmentation model to obtain the corresponding sample candidate region image. Then, the computer device performs feature extraction on the sample candidate region image by using the second CNN in the target segmentation model to obtain the corresponding sample feature map. The computer device performs semantic segmentation on the sample feature map by using the FCN in the target segmentation model to obtain a predicted segmentation result corresponding to the target in the video frame sample. The computer device revises the predicted affine transformation information based on the sample feature map by using the second fully connected network in the target segmentation model to obtain the predicted affine transformation difference information corresponding to the video frame sample.

S610: Determine standard affine transformation difference information according to a difference between the predicted affine transformation information and the standard affine transformation information.

The standard affine transformation difference information is used as control information of an affine transformation revision module in the target segmentation model, that is, as control information of the second fully connected network in the training process. In some embodiments, the computer device may determine the standard affine transformation difference information according to a difference between the predicted affine transformation information and the standard affine transformation information. For example, when the affine transformation information is an affine transformation parameter, the computer device can calculate the standard affine transformation difference information by using the following formula:

$$\hat{\theta}_t'\text{standard}=\theta_t-\hat{\theta}_t, \hat{\theta}_t \in \{\text{Angle}, \text{Shift}_x, \text{Shift}_y, \text{Scale}\},$$

$\hat{\theta}_t'$standard represents a standard affine transformation difference parameter; $\hat{\theta}_t$ represents an affine transformation parameter corresponding to a current frame, that is, a predicted affine transformation parameter; and $\theta_t$ represents a standard affine transformation parameter.

S612: Construct an affine transformation information revision loss function according to the standard affine transformation difference information and the predicted affine transformation difference information.

The affine transformation information revision loss function is used for evaluating a degree of difference between the predicted affine transformation difference information and the standard affine transformation difference information. The affine transformation information revision loss function assumes the responsibility for training the second fully connected network, so that the second fully connected network in the target segmentation model can generate the affine transformation difference information after the predicted affine transformation information is revised.

In some embodiments, the computer device may construct the affine transformation information revision loss function according to the standard affine transformation difference information and the predicted affine transformation difference information. In an embodiment, the computer device can calculate losses of the standard affine transformation difference information and the predicted affine transformation difference information by using a distance function, such as an L1-Norm function, that is, construct the affine transformation information revision loss function based on the L1-Norm function. It may be understood that in the embodiments of this application, another function may alternatively be used to construct the affine transformation information revision loss function, as long as the function can be used to measure the degree of difference between the standard affine transformation difference information and the predicted affine transformation difference information, such as an L2-Norm function.

It may be understood that the predicted affine transformation difference information is used for determining updated affine transformation information, and transmitting the updated affine transformation information to a subsequent video frame in a video frame sequence. When the affine transformation information is an affine transformation parameter, the updated affine transformation parameter can be calculated by using the following formula: $\hat{\theta}_{t+1}'=f(\hat{\theta}', \hat{\theta}_t)=\hat{\theta}_t'\times\hat{\theta}_t+\hat{\theta}_{t+1}$, where $\hat{\theta}_{t+1}'$ represents an updated affine transformation parameter transmitted by a current frame; $\hat{\theta}_t'$ represents a predicted affine transformation difference parameter; and $\hat{\theta}_t$ represents a predicted affine transformation parameter.

S614: Determine a segmentation loss function according to the predicted segmentation result and the sample annotation information.

The segmentation loss function is used for evaluating a degree of difference between a predicted segmentation result and sample annotation information. The segmentation loss function assumes the responsibility for training an FCN, so that the FCN in the target segmentation model can accurately obtain a target object by segmenting an inputted video frame. In some embodiments, the computer device may determine a segmentation loss function according to the predicted segmentation result and the sample annotation information.

S616: Adjust, according to the affine loss function, the affine transformation information revision loss function, and the segmentation loss function, model parameters of the target segmentation model and continue training the model until a training stop condition is met.

The training stop condition is a condition for ending model training. The training stop condition may be that a preset quantity of iterations is reached, or that a performance indicator of the target segmentation model with adjusted model parameters reaches a preset indicator.

In some embodiments, the computer device may jointly adjust, according to the affine loss function, the affine transformation information revision loss function, and the segmentation loss function, model parameters of each network structure in the target segmentation model and continue training the model until a training stop condition is met.

It may be understood that for each loss function, the computer device may adjust model parameters in the direction of reducing the difference between a corresponding prediction result and reference parameters. Accordingly, video frame samples are continuously inputted to obtain predicted affine transformation information, predicted affine transformation difference information, and predicted segmentation results. The model parameters are adjusted according to the difference between the predicted affine transformation information and the standard affine transformation information, the difference between the predicted affine transformation difference information and the standard affine transformation difference information, and the difference between the predicted segmentation results and the sample annotation information, so as to train the target segmentation model to obtain a trained target segmentation model.

According to the foregoing embodiments, in the model training process, affine transformation control information, that is, standard affine transformation information, is introduced to improve the accuracy of orientation prediction. In addition, revision training can be performed on predicted affine transformation information to reduce the segmentation error caused by incorrect positioning. In the training, an affine loss function, an affine transformation information revision loss function, and a segmentation loss function are superimposed and optimized together, so that various parts influence each other and improve each other in the training process. Accordingly, the target segmentation model obtained by training has accurate video semantic segmentation performance.

Figure 9:
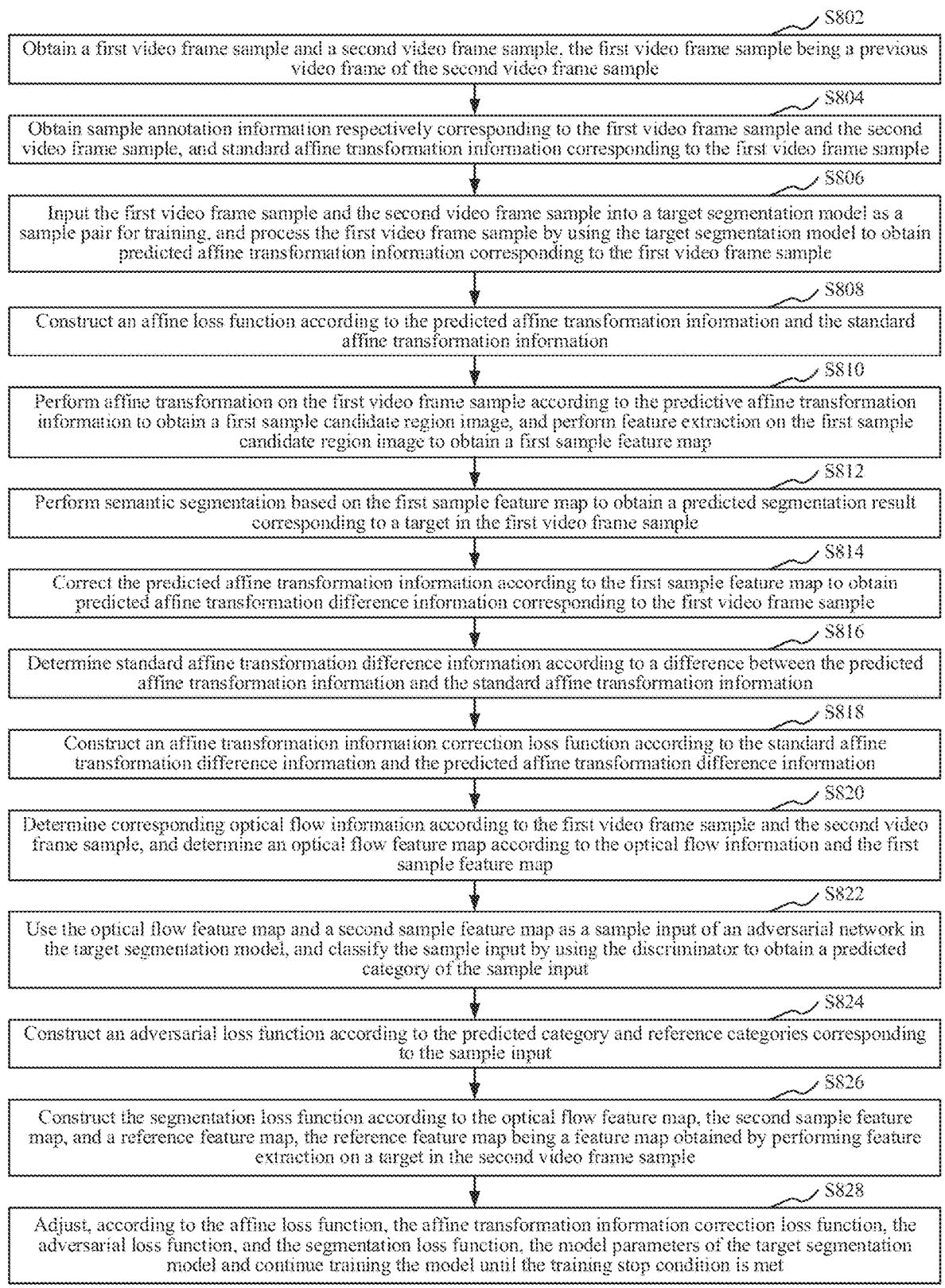
FIG. 9 is a schematic flowchart of a model training method according to an embodiment.

Referring to FIG. 9, in an embodiment, the model training method includes the following steps:

S802: Obtain a first video frame sample and a second video frame sample, the first video frame sample being a previous video frame of the second video frame sample.

The first video frame sample and the second video frame sample are different video frame samples. The first video frame sample is a previous video frame of the second video frame sample, that is, the generation time point of the first video frame sample is before that of the second video frame sample. In an embodiment, the first video frame sample and the second video frame sample may be adjacent video frames.

S804: Obtain sample annotation information respectively corresponding to the first video frame sample and the second video frame sample, and standard affine transformation information corresponding to the first video frame sample.

In some embodiments, the computer device may obtain the sample annotation information respectively corresponding to the first video frame sample and the second video frame sample, and the standard affine transformation information corresponding to the first video frame sample. The sample annotation information may include sample key point position information and sample region position information. For steps of obtaining the standard affine transformation information, reference may be made to the obtaining steps described in the foregoing embodiments.

S806: Input the first video frame sample and the second video frame sample into a target segmentation model as a sample pair for training, and process the first video frame sample by using the target segmentation model to obtain predicted affine transformation information corresponding to the first video frame sample.

Figure 10:
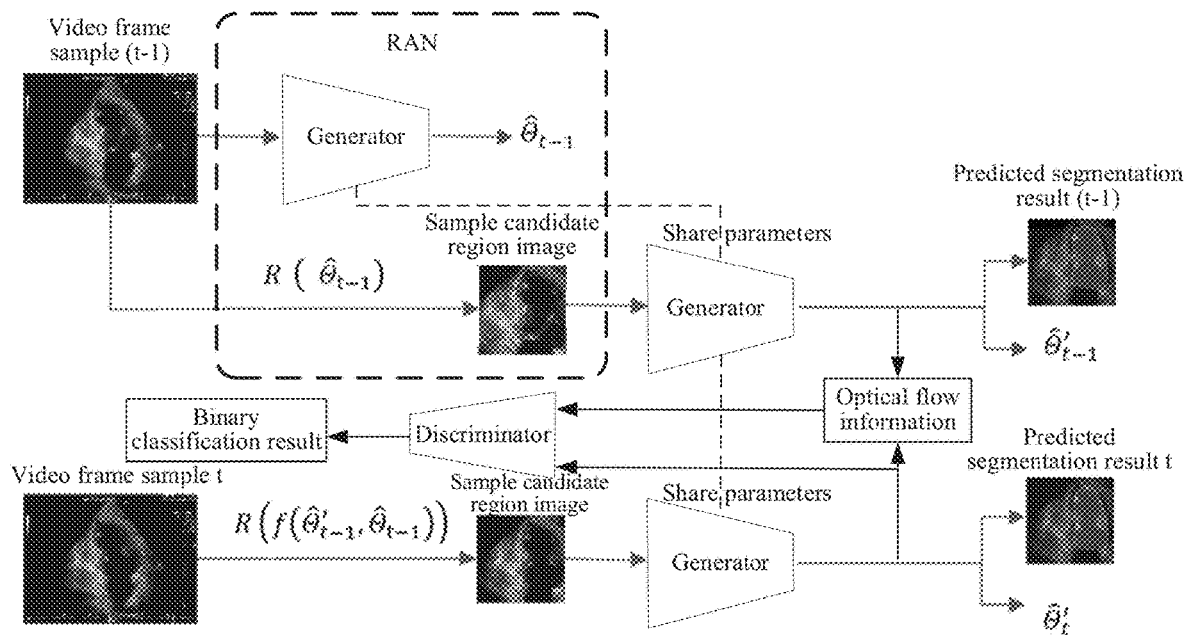
FIG. 10 is a schematic architectural diagram of a target segmentation model in a model training process according to an embodiment.

In some embodiments, FIG. 10 is a schematic architectural diagram of a target segmentation model in a model training process according to an embodiment. As shown in FIG. 10, the computer device may input two adjacent video frame samples as a sample pair into the target segmentation model. The first video frame sample is processed by using the target segmentation model to obtain the predicted affine transformation information $\hat{\theta}_{t-1}$ corresponding to the first video frame sample.

S808: Construct an affine loss function according to the predicted affine transformation information and the standard affine transformation information.

In some embodiments, the computer device may construct the affine loss function according to the predicted affine transformation information and the standard affine transformation information. In an embodiment, the computer device can calculate losses of predicted affine transformation information and standard affine transformation information by using a distance function, such as an L1-Norm function, that is, construct affine loss functions of the predicted affine transformation information and the standard affine transformation information based on the L1-Norm function. It may be understood that in the embodiments of this application, another function may alternatively be used to construct the loss function, as long as the function can be used to measure the degree of difference between the predicted affine transformation information and the standard affine transformation information, such as an L2-Norm function.

S810: Perform affine transformation on the first video frame sample according to the predicted affine transformation information to obtain a first sample candidate region image, and perform feature extraction on the first sample candidate region image to obtain a first sample feature map.

In some embodiments, referring to the upper half part of FIG. 10, the computer device may perform affine transformation on the first video frame sample according to the predicted affine transformation information to obtain a first sample candidate region image, and perform feature extraction on the first sample candidate region image by using a generator (which can be implemented by using a CNN) to obtain a first sample feature map corresponding to the first video frame sample.

S812: Perform semantic segmentation based on the first sample feature map to obtain a predicted segmentation result corresponding to a target in the first video frame sample.

In some embodiments, referring to FIG. 10, two task branches are performed on the first sample feature map, where one task branch is a segmentation task branch. The target segmentation model may perform semantic segmentation on the first sample feature map by using an FCN. After two times of upsampling are performed by using the FCN, based on the prediction of each pixel, a predicted segmentation result corresponding to the target in the first video frame sample is obtained.

S814: Revise the predicted affine transformation information according to the first sample feature map to obtain predicted affine transformation difference information corresponding to the first video frame sample.

In some embodiments, referring to FIG. 10, the second task branch is a positioning task branch. In the positioning task branch, regression is performed on the first sample feature map to obtain a new affine transformation difference parameter, which is the predicted affine transformation difference information, by using an FC layer with a channel of 4.

S816: Determine standard affine transformation difference information according to a difference between the predicted affine transformation information and the standard affine transformation information.

In some embodiments, the computer device may determine the standard affine transformation difference information according to a difference between the predicted affine transformation information and the standard affine transformation information. For example, when the affine transformation information is an affine transformation parameter, the computer device may calculate the standard affine transformation difference information by using the following formula:

$$\hat{\theta}'_t \text{standard} = \frac{\theta_t - \hat{\theta}_t}{\hat{\theta}_t}, \theta \in \{\text{Angle, Shift}_x, \text{Shift}_y, \text{Scale}\},$$

where $\hat{\theta}_t'$ standard represents standard affine transformation difference information; $\hat{\theta}_t$ represents an affine transformation parameter corresponding to a current frame, that is, a predicted affine transformation parameter; and $\theta_t$ represents a standard affine transformation parameter.

S818: Construct an affine transformation information revision loss function according to the standard affine transformation difference information and the predicted affine transformation difference information.

In some embodiments, the computer device may construct the affine transformation information revision loss function according to the standard affine transformation difference information and the predicted affine transformation difference information. In an embodiment, the computer device can calculate losses of the standard affine transformation difference information and the predicted affine transformation difference information by using a distance function, such as an L1-Norm function, that is, construct the affine transformation information revision loss function based on the L1-Norm function. It may be understood that in the embodiments of this application, another function may alternatively be used to construct the affine transformation information revision loss function, as long as the function can be used to measure the degree of difference between the standard affine transformation difference information and the predicted affine transformation difference information, such as an L2-Norm function.

It may be understood that the predicted affine transformation difference information is used for determining updated affine transformation information, and transmitting the updated affine transformation information to a subsequent video frame in a video frame sequence. When the affine transformation information is an affine transformation parameter, the updated affine transformation information can be calculated by using the following formula: $\hat{\theta}_{t+1}'=f(\hat{\theta}_t',\hat{\theta}_t)=\hat{\theta}_t' \times \hat{\theta}_t + \hat{\theta}_t$, where $\hat{\theta}_{t+1}'$ represents updated affine transformation information transmitted by a current frame; $\hat{\theta}_t'$ represents a predicted affine transformation difference parameter; and $\hat{\theta}_t$ represents a predicted affine transformation parameter.

S820: Determine corresponding optical flow information according to the first video frame sample and the second video frame sample, and determine an optical flow feature map according to the optical flow information and the first sample feature map.

In some embodiments, the computer device may determine corresponding optical flow information according to the first video frame sample and the second video frame sample. For example, the computer device can calculate the optical flow information corresponding to the first video frame sample by using a Lucas-Kanade optical flow method (a two-frame differential optical flow calculation method). Furthermore, the computer device may obtain the optical flow feature map by calculation according to the optical flow information and the first sample feature map. The optical flow feature map can be considered as a feature map that corresponds to the second video frame sample and that is predicted by using the first video frame sample and fuses with the optical flow information.

S822: Use the optical flow feature map and a second sample feature map as a sample input of a discriminator in the target segmentation model, and classify the sample input by using the discriminator to obtain a predicted category of the sample input.

In some embodiments, in the model training stage, the target segmentation network further includes a discriminator. The computer device may use the optical flow feature map and the second sample feature map as the sample input of the discriminator in the target segmentation model. Either of the two is inputted, and the discriminator is used to determine whether the inputted feature is the optical flow feature map or the second sample feature map. The second sample feature map is a sample feature map corresponding to the second video frame sample, and may also be referred to as a CNN feature map.

S824: Construct an adversarial loss function according to the predicted category and reference categories corresponding to the sample input.

The reference categories corresponding to the sample input may be categories corresponding to the optical flow feature map and the second sample feature map respectively, such as an optical flow category and a feature category. The discriminator is essentially a binary classification network. The computer device may use a binary classification cross entropy as the loss function of the discriminator to determine whether the sample input is an optical flow feature map. That is, according to the predicted category and the reference category corresponding to the sample input, the adversarial loss function of the target segmentation model is constructed according to a cross entropy function.

S826: Construct the segmentation loss function according to the optical flow feature map, the second sample feature map, and a reference feature map, the reference feature map being a feature map obtained by performing feature extraction on a target in the second video frame sample.

In some embodiments, the computer device can perform feature extraction on the target in the second video frame sample to obtain the reference feature map. Then, the computer device may construct the segmentation loss function according to the optical flow feature map, the second sample feature map, and the reference feature map.

In an embodiment, the computer device may construct the segmentation loss function by using the following formula:

$$\text{loss}_{seg_t} = f_{dice}(F_{CNN}, F_{CNN}') + f_{bce}(F_{CNN}, F_{CNN}') + f_{mse}(F_{OF}', F_{CNN}'),$$

where $F_{CNN}'$ and $F_{OF}'$ respectively represent a second sample feature map and an optical flow feature map that is obtained by using optical flow. $F_{CNN}$ represents a reference feature map. $f_{dice}$, $f_{bce}$, and $f_{mse}$ respectively represent a Dice calculation formula, a binary-classification cross entropy calculation formula, and a mean square error calculation formula. Larger $f_{mse}$ indicates a larger difference between the second sample feature map and the optical flow feature map. Accordingly, the generator is aggravatingly punished to complete parameter update, so that the generator can produce a feature map that is more in line with the optical flow feature. $f_{dice}$ and $f_{bce}$ are used to make the generator produce a feature map that is more matched with manual annotation information.

S828: Adjust, according to the affine loss function, the affine transformation information revision loss function, the adversarial loss function, and the segmentation loss function, the model parameters of the target segmentation model and continue training the model until the training stop condition is met.

In some embodiments, the computer device may jointly adjust, according to the affine loss function, the affine transformation information revision loss function, the adversarial loss function, and the segmentation loss function, model parameters of each network structure in the target segmentation model and continue training the model until a training stop condition is met.

In an embodiment, when the target segmentation model is trained, a method that combines cross-training and joint-training may be used for training. For example, referring to FIG. 10, the computer device may first train the generator for a period of time, then fix parameters obtained from the training, and temporarily not return the parameters. Then, the computer device retrains the discriminator, fixes the parameters of the discriminator, retrains the generator, and then performs the joint training in combination with various network structures after training results are stable. In this case, the training stop condition may also be considered as a convergence condition, which can be that the loss function of the discriminator no longer drops; the output of the discriminator is stable at about (0.5, 0.5), and the discriminator cannot distinguish the difference between the optical flow feature map and the CNN feature map.

It may be understood that after the generator and the discriminator contend with each other, the entire network reaches a state of convergence. The generator eventually generates a feature of the common part of the CNN feature and the optical flow information, and the discriminator cannot distinguish the difference between the optical flow feature and the CNN feature. In the use stage of the model, the discriminator can be removed. In this case, the generator generates a feature map fusing with the optical flow information.

In an embodiment, each generator in the target segmentation model can share parameters. That is, the three generators in FIG. 9 can be considered as the same generator.

According to the foregoing embodiments, in the model training process, affine transformation control information, that is, standard affine transformation information, is introduced to improve the accuracy of orientation prediction. In addition, revision training can be performed on predicted affine transformation information to reduce the segmentation error caused by incorrect positioning. Furthermore, the adversarial learning method with optical flow information is used to achieve the consistency of the network in sequence, which makes the training more targeted and better in performance. Thus, in the training, the affine loss function, the affine transformation information revision loss function, adversarial loss function, and the segmentation loss function are superimposed and optimized together, so that various parts influence each other and improve each other in the training process. Accordingly, the target segmentation model obtained by training can accurately and smoothly obtain the target object by segmenting the video.

In an embodiment, a model training method is provided. In this embodiment, description is made mainly by using an example in which the method is applicable to the computer device in FIG. 1. The model training method includes the following steps: obtaining a video frame sample, sample annotation information corresponding to the video frame sample, and standard affine transformation information corresponding to the video frame sample; inputting the video frame sample into a target segmentation model for training, and determining predicted affine transformation information corresponding to the video frame sample by using the target segmentation model; constructing an affine loss function according to the predicted affine transformation information and the standard affine transformation information; outputting predicted affine transformation difference information corresponding to the video frame sample and a predicted segmentation result corresponding to a target in the video frame sample by using the target segmentation model; determining standard affine transformation difference information according to a difference between the predicted affine transformation information and the standard affine transformation information; constructing an affine transformation information revision loss function according to the standard affine transformation difference information and the predicted affine transformation difference information; determining a segmentation loss function according to the predicted segmentation result and the sample annotation information; and adjusting, according to the affine loss function, the affine transformation information revision loss function, and the segmentation loss function, model parameters of the target segmentation model and continuing training the model until a training stop condition is met.

For a detailed description of each step in the model training method, refer to the description of the model training steps of the target segmentation model in the foregoing embodiments. The training methods are the same, and the description is not repeated herein.

In an embodiment, an echocardiography video is taken as an example to illustrate the training process of the target segmentation model in detail. Referring to FIG. 9, in training, two adjacent video frame samples can be inputted into the RAN as a sample pair. In a first stage, the current frame undergoes affine transformation by the RAN to revise the target position, size and orientation to obtain an ROI image distributed in the same way as the template. The revised ROI image is less interfered by, such as the similarity between other heart chambers and the left ventricle, the influence of image annotation and artifacts. In a second stage, the generator is reused to extract a feature from the ROI image, and the outputted feature enters two task branches. In the segmentation task branch, the outputted feature is upsampled twice to obtain a segmentation prediction map, and a segmentation result is outputted. In the positioning task branch, the FC layer with a channel of 4 performs a regression on the feature to obtain a new affine transformation difference result. In the second stage, the affine transformation information generated in the first stage is revised for a second time by using a regression difference.

When the affine transformation information is an affine transformation parameter, control information of the affine transformation difference result in the second stage can be calculated by using the following formula:

$$\hat{\theta}'_t \text{standard} = \frac{\theta_t - \hat{\theta}_t}{\hat{\theta}_t}, \theta \in \{\text{Angle, Shift}_x, \text{Shift}_y, \text{Scale}\},$$

where $\hat{\theta}_t'$ standard represents standard affine transformation difference information, $\hat{\theta}_t$ represents an affine transformation parameter corresponding to a current frame, that is, a predicted affine transformation parameter, and $\hat{\theta}_t$ represents a standard affine transformation parameter.

Since the difference is small, to accelerate the network convergence, an L1-Norm function can be used to calculate the loss value. The affine transformation difference parameter of the current frame predicted in the second stage is used to calculate the updated affine transformation information and transmit the information to the next video frame. The next video frame is directly subjected to affine transformation according to the foregoing parameters to obtain the ROI. Likewise, the generator extracts the feature of the ROI, and again predicts the segmentation result and the affine transformation difference result. Based on the first stage, in the second stage the affine transformation information is revised for a second time, as shown in the foregoing formula. In the second stage, an affine transformation information change value relative to the first stage is predicted. The L1-Norm function is used again to calculate the loss value. The affine transformation difference parameter of the current frame predicted in the second stage is transmitted to the next frame, and the updated affine transformation information is calculated according to the following formula in the next frame: $\hat{\theta}_{t+1}'=f(\hat{\theta}_t',\hat{\theta}_t)=\hat{\theta}_t'\times\hat{\theta}_t+\hat{\theta}_t$, where $\hat{\theta}_{t+1}'$ represents updated affine transformation information transmitted by a current frame, $\hat{\theta}_t'$ represents a predicted affine transformation difference parameter, and $\hat{\theta}_t$ represents a predicted affine transformation parameter. Likewise, a feature of an ROI corresponding to the next video frame is extracted by the generator, and the segmentation result and the affine transformation difference result are predicted again. In addition, progressive changing is an important feature of the change of a target in a video. In an echocardiography video frame, the left ventricle gradually expands or shrinks over time, and there is basically no sudden change. However, due to the blurring of the boundary information of the segmentation target and the interference from artifacts, a sudden volume change in the left ventricle caused by wrong segmentation may still occur in some video frames despite the addition of a-priori information such as sequence, orientation, and structure. In view of this situation, optical flow information can be introduced in the model training. Assuming that changes in two adjacent frames in the left ventricle are relatively small, the next video frame can be calculated from the optical flow information of the previous video frame. In the training, there are two feature forms for the current frame: one is a feature extracted based on the current frame by using the CNN, and the other is a feature obtained by performing transformation based on the feature of the previous frame by using the optical flow information. For this reason, a discriminator can be designed to introduce the two types of information at the same time. As shown in FIG. 9, two features are inputted into the discriminator: one is derived from the feature extracted by the generator from the ROI of the next frame, and the other is derived from the feature of the ROI of the next frame obtained by performing transformation based on the feature of the ROI of the current frame by using the optical flow information. Either of the two is inputted, and the discriminator determines whether the inputted feature is a feature of optical flow transformation (flow field) or a CNN feature. Accordingly, the introduction of the discriminator makes the generator produce a segmentation feature with optical flow information and CNN information of a current frame. Therefore, the following loss function can be used in the segmentation task branch: $loss_{seg_t} = f_{dice}(F_{CNN}, F_{CNN}') + f_{bce}(F_{CNN}, F_{CNN}') + f_{mse}(F_{OF}', F_{CNN})$.

where $F_{CNN}'$ and $F_{OF}'$ respectively represent a second sample feature map and an optical flow feature map that is obtained by using optical flow. $F_{CNN}$ represents a reference feature map. $L_{dice}$, $f_{bce}$, and $f_{mse}$ respectively represent a Dice calculation formula, a binary-classification cross entropy calculation formula, and a mean square error calculation formula. Larger $f_{mse}$ indicates a larger difference between the second sample feature map and the optical flow feature map. Accordingly, the generator is aggravatingly punished to complete parameter update, so that the generator can produce a feature map that is more in line with the optical flow feature. $f_{dice}$ and $f_{bce}$ are used to make the generator produce a feature map that is more matched with manual annotation information.

In addition, for the discriminator, a binary classification cross entropy is used as the loss function to determine whether the input is an optical flow feature. After the generator and the discriminator contend with each other, the entire network reaches a state of convergence. The generator eventually generates a feature of the common part of the CNN feature and the optical flow information, and the discriminator cannot distinguish the difference between the optical flow feature and the CNN feature. When the model is used, the discriminator is removed, and the generator generates a feature map fusing with the optical flow information.

The following describes in detail the segmentation of the left ventricle implemented by using the image segmentation method in combination with an application scenario, for example, a scenario of early cardiac screening, where the left ventricle in the echocardiography video is used as the target.

In clinical practice, early cardiac screening is an important measure to prevent and diagnose heart diseases. In view of its advantages of rapid screening, low price, and rich information, cardiac B-mode ultrasound is currently a relatively common early screening method. In the echocardiography, clinically, areas of the left ventricle in the A4C and the A2C in the cardiac cycle ultrasound is often used in conjunction with the Simpson method to estimate the ejection fraction, which is an important information source for diagnosing cardiac functions. The computer-aided automatic segmentation of the left ventricle is an important basis for calculating cardiac function indicators (such as the ejection fraction). However, the boundary of the object in the left ventricle is blurred, and the edges are easily lost due to influence of artifacts, which seriously affects the accuracy of segmentation. In addition, the change of the left ventricle is strongly related to time, and the sudden change of the left ventricular contour caused by the prediction error can extremely easily lead to the miscalculation of clinical indicators. In addition, the implementation of ultrasound video screening places great demands on the size and real-time performance of the network.

In consideration of the foregoing difficulties, an end-to-end video target segmentation model based on the RAN is provided in the embodiments of this application. The target structure information of the previous video frame (that is, the historical affine transformation information transmitted by the previous video frame) is introduced into the current frame to improve the segmentation performance. The RAN is a prediction network that includes control information and that can learn affine transformation information. The introduction of affine control information makes the prediction of the affine transformation parameter more accurate. Based on the two-stage positioning network, the transformation error transmitted by the previous video frame can be revised for a second time, the robustness of the network is increased, and the segmentation error caused by the affine transformation information error is reduced. In addition, the adversarial learning network based on the optical flow information can make the segmentation result in line with the progressivity of sequence transformation during training, so as to obtain a more appropriate segmentation result. The entire network is trained end to end with parts complementing each other and improving each other. The introduction of target structure information reduces noise interference, reduces the difficulty of segmentation, and obtains an excellent segmentation result by using a lightweight coding network. In addition, the sequence analysis and the time smoothing of the video are all concentrated in the training stage, which reduces the operations on the model in the use process, greatly reduces the time consumption of target segmentation, and improves the efficiency.

The image segmentation method provided in the embodiments of this application, combined with the Simpson method, can be used in clinical echocardiography to perform screening for heart diseases, which can free the hands of the physician, and reduce the repetitive labor and subjective differences caused by annotation of the physician. The networks that implement the target segmentation model are small in structure and good in in real-time performance. Thus, the end-to-end network has a high degree of engineering and is extremely easy to migrate to mobile devices.

The segmentation result obtained by segmenting the left ventricle in the echocardiography video in the embodiments of this application can be used as an automated solution for clinically measuring the ejection fraction by combining the cardiac B-mode ultrasound with the Simpson method; the end-to-end network specially designed for a single object in a video into which sequence information and target structure location information are introduced can obtain a segmentation result that better fits the nature of the video; the adversarial learning network adaptively increases the smoothness of video segmentation, making the segmentation result more proper; and the image segmentation method implements a lightweight network which has high segmentation performance, has extremely strong real-time performance, and has a high degree of engineering.

Figure 11:
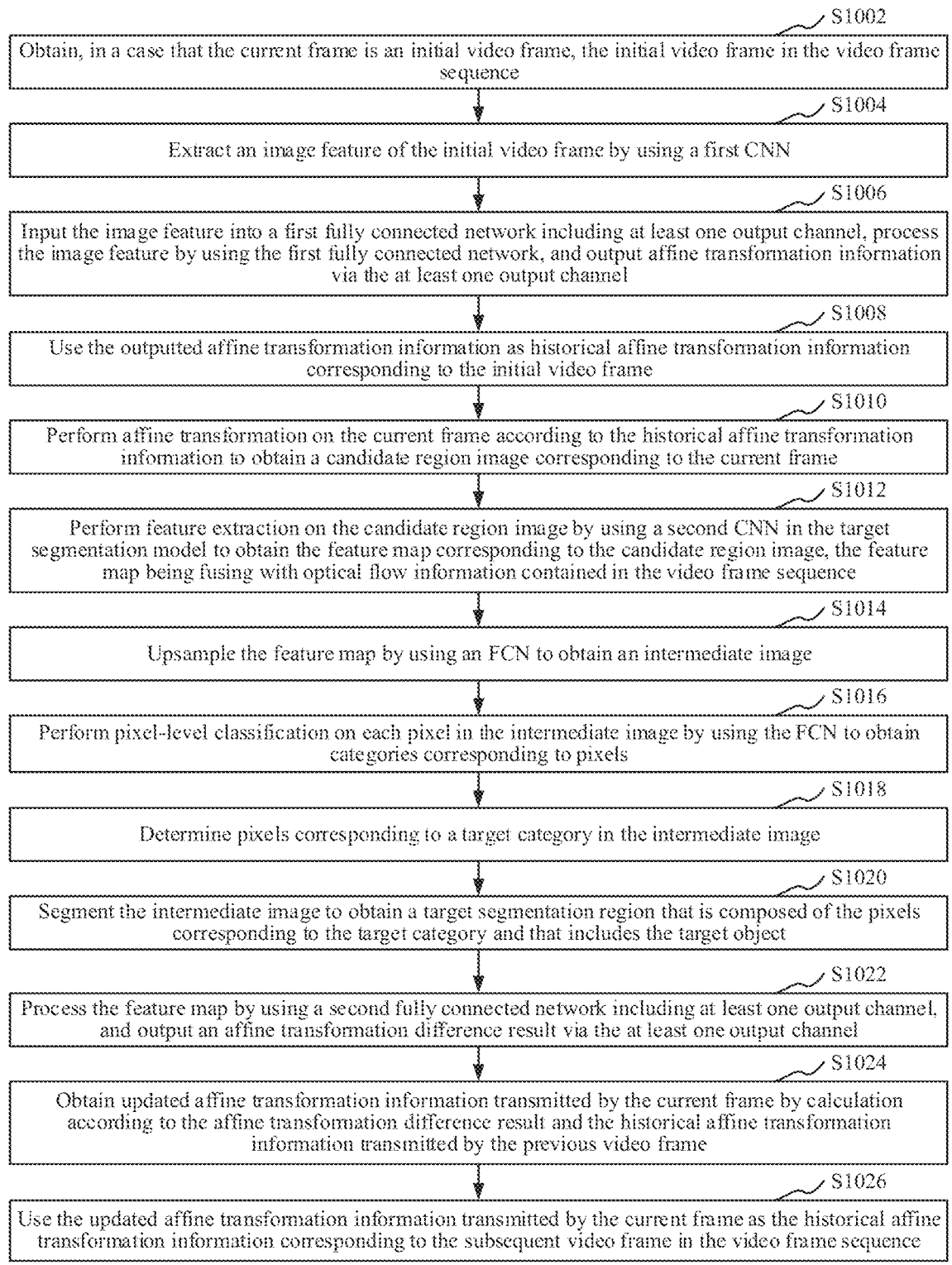
FIG. 11 is a schematic flowchart of an image segmentation method according to a specific embodiment.

In an embodiment, as shown in FIG. 11, the image segmentation method includes the following steps:

S1002: Obtain, when the current frame is an initial video frame, the initial video frame in the video frame sequence.

S1004: Extract an image feature of the initial video frame by using a first CNN.

S1006: Input the image feature into a first fully connected network, process the image feature by using the first fully connected network, and output affine transformation information via at least one output channel of the first fully connected network.

S1008: Use the outputted affine transformation information as historical affine transformation information corresponding to the initial video frame.

When the current frame is not the initial video frame, historical affine transformation information corresponding to the previous video frame is read from a cache.

S1010: Perform affine transformation on the current frame according to the historical affine transformation information to obtain a candidate region image corresponding to the current frame.

S1012: Perform feature extraction on the candidate region image by using a second CNN in the target segmentation model to obtain the feature map corresponding to the candidate region image, the feature map being fusing with optical flow information contained in the video frame sequence.

S1014: Upsample the feature map by using an FCN to obtain an intermediate image.

S1016: Perform pixel-level classification on each pixel in the intermediate image by using the FCN to obtain categories corresponding to pixels.

S1018: Determine pixels corresponding to a target category in the intermediate image.

S1020: Segment the intermediate image to obtain a target segmentation region that is composed of the pixels corresponding to the target category and that includes the target object.

S1022: Process the feature map by using a second fully connected network, and output an affine transformation difference result via at least one output channel of the second fully connected network.

S1024: Obtain updated affine transformation information transmitted by the current frame by calculation according to the affine transformation difference result and the historical affine transformation information transmitted by the previous video frame.

S1026: Use the updated affine transformation information transmitted by the current frame as the historical affine transformation information corresponding to the subsequent video frame in the video frame sequence.

According to the foregoing image segmentation method, affine transformation is performed on a current frame according to historical affine transformation information transmitted by a previous video frame to obtain a candidate region image corresponding to the current frame. The historical affine transformation information transmitted by the previous video frame are revised parameters, which can greatly improve the accuracy of the obtaining of the candidate region image. Semantic segmentation is performed on a feature map corresponding to the candidate region image, so that a segmentation result corresponding to a target in the current frame can be accurately obtained. In addition, the historical affine transformation information is revised according to the feature map, and the revised affine transformation information is transmitted to a subsequent video frame for use in the subsequent video frame. Accordingly, the positioning of the current frame can be revised, thereby reducing the error in the subsequent segmentation processing caused by wrong positioning, to greatly improve the accuracy of the semantic segmentation of a video.

FIG. 11 is a schematic flowchart of an image segmentation method according to an embodiment. It is to be understood that, although each step of the flowcharts in FIG. 11 is displayed sequentially according to arrows, the steps are not necessarily performed according to an order indicated by arrows. Unless otherwise explicitly specified in this application, execution of the steps is not strictly limited, and the steps may be performed in other sequences. In addition, at least some steps in FIG. 11 may include a plurality of substeps or a plurality of stages. The substeps or the stages are not necessarily performed at the same moment, but may be performed at different moments. The substeps or the stages are not necessarily performed in sequence, but may be performed in turn or alternately with another step or at least some of substeps or stages of another step.

Figure 12:
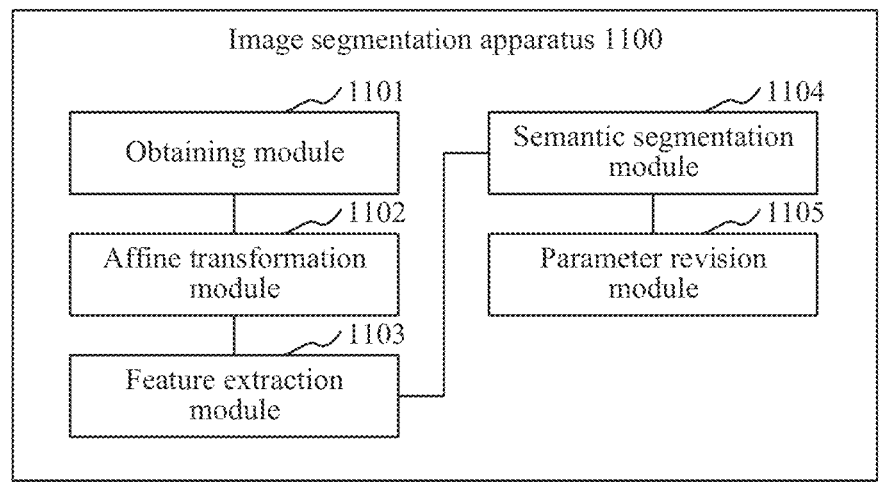
FIG. 12 is a structural block diagram of an image segmentation apparatus according to an embodiment.

As shown in FIG. 12, in an embodiment, an image segmentation apparatus 1100 is provided, including an obtaining module 1101, an affine transformation module 1102, a feature extraction module 1103, a semantic segmentation module 1104, and a parameter revision module 1105.

The obtaining module 1101 is configured to obtain a current frame and historical affine transformation information of a previous video frame in a video frame sequence.

The affine transformation module 1102 is configured to perform affine transformation on the current frame according to the historical affine transformation information to obtain a candidate region image corresponding to the current frame.

The feature extraction module 1103 is configured to perform feature extraction on the candidate region image to obtain a feature map corresponding to the candidate region image.

The semantic segmentation module 1104 is configured to perform semantic segmentation based on the feature map to obtain a segmentation result corresponding to a target in the current frame.

The parameter revision module 1105 is configured to revise the historical affine transformation information according to the feature map to obtain updated affine transformation information, and use the updated affine transformation information as historical affine transformation information corresponding to a subsequent video frame in the video frame sequence.

In an embodiment, when the current frame is an initial video frame, the obtaining module 1101 is further configured to obtain, when the current frame is an initial video frame, the initial video frame in the video frame sequence; extract an image feature of the initial video frame by using a first CNN; input the image feature into a first fully connected network, process the image feature by using the first fully connected network, and output affine transformation information via at least one output channel of the first fully connected network; and use the outputted affine transformation information as historical affine transformation information corresponding to the initial video frame.

In an embodiment, the feature map obtained by performing feature extraction on a candidate region image fuses with optical flow information contained in the video frame sequence.

In an embodiment, the semantic segmentation module 1104 is further configured to upsample the feature map by using an FCN to obtain an intermediate image; perform pixel-level classification on each pixel in the intermediate image by using the FCN to obtain categories corresponding to pixels; and output the segmentation result of semantic segmentation on the target in the current frame according to the categories corresponding to the pixels.

In an embodiment, the semantic segmentation module 1104 is further configured to determine pixels corresponding to a target category in the intermediate image; and segment the intermediate image to obtain a target segmentation region that is composed of the pixels corresponding to the target category and that includes the target object.

In an embodiment, the parameter revision module 1105 is further configured to process the feature map by using a second fully connected network, and output an affine transformation difference result via at least one output channel of the second fully connected network; obtain updated affine transformation information of the current frame by calculation according to the affine transformation difference result and the historical affine transformation information of the previous video frame; and use the updated affine transformation information of the current frame as the historical affine transformation information corresponding to the subsequent video frame in the video frame sequence.

In an embodiment, the feature extraction module 1103 is further configured to perform feature extraction on the candidate region image by using a second CNN in the target segmentation model to obtain the feature map corresponding to the candidate region image. The semantic segmentation module 1104 is further configured to perform semantic segmentation on the feature map by using an FCN in the target segmentation model to obtain the segmentation result corresponding to the target in the current frame. The parameter revision module 1105 is further configured to revise the historical affine transformation information by using a second fully connected network in the target segmentation model to obtain the updated affine transformation information.

Figure 13:
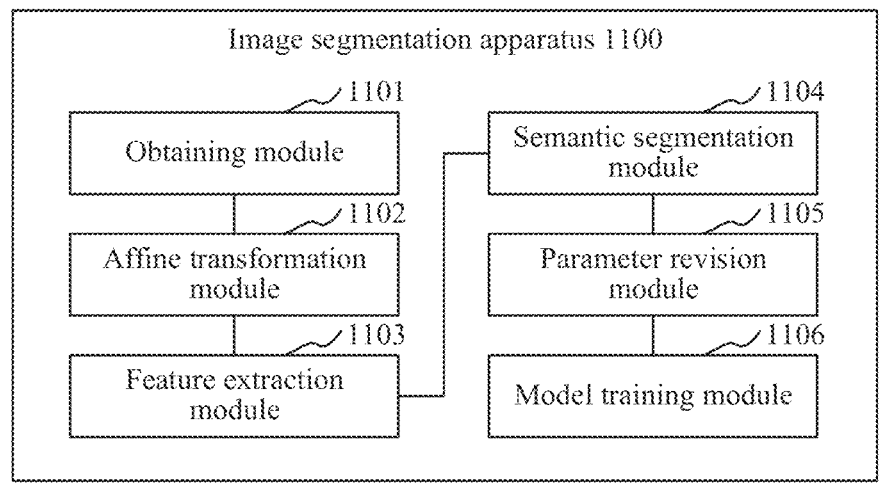
FIG. 13 is a structural block diagram of an image segmentation apparatus according to another embodiment.

As shown in FIG. 13, in an embodiment, the image segmentation apparatus further includes a model training module 1106, configured to obtain a video frame sample, sample annotation information corresponding to the video frame sample, and standard affine transformation information corresponding to the video frame sample; input the video frame sample into a target segmentation model for training, and obtain predicted affine transformation information corresponding to the video frame sample by using the target segmentation model; construct an affine loss function according to the predicted affine transformation information and the standard affine transformation information; output predicted affine transformation difference information corresponding to the video frame sample and a predicted segmentation result corresponding to a target in the video frame sample by using the target segmentation model; determine standard affine transformation difference information according to a difference between the predicted affine transformation information and the standard affine transformation information; construct an affine transformation information revision loss function according to the standard affine transformation difference information and the predicted affine transformation difference information; determine a segmentation loss function according to the predicted segmentation result and the sample annotation information; and adjust, according to the affine loss function, the affine transformation information revision loss function, and the segmentation loss function, model parameters of the target segmentation model and continue training the model until a training stop condition is met.

According to the foregoing image segmentation apparatus, affine transformation is performed on a current frame according to historical affine transformation information of a previous video frame to obtain a candidate region image corresponding to the current frame. The historical affine transformation information of the previous video frame are revised parameters, which can greatly improve the accuracy of the obtaining of the candidate region image. Semantic segmentation is performed on a feature map corresponding to the candidate region image, so that a segmentation result corresponding to a target in the current frame can be accurately obtained. In addition, the historical affine transformation information is revised according to the feature map, and the revised affine transformation information is transmitted to a subsequent video frame for use in the subsequent video frame. Accordingly, the positioning of the current frame can be revised, thereby reducing the error in the subsequent segmentation processing caused by wrong positioning, to greatly improve the accuracy of the semantic segmentation of a video.

Figure 14:
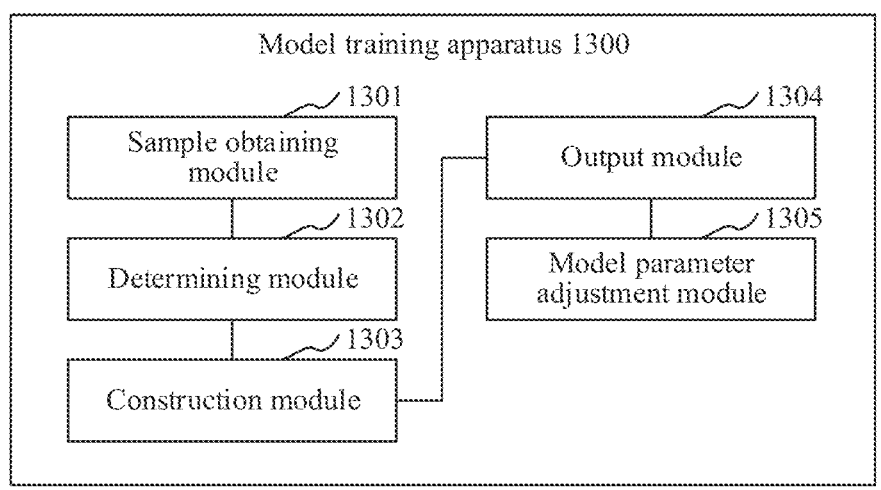
FIG. 14 is a structural block diagram of a model training apparatus according to an embodiment.

As shown in FIG. 14, in an embodiment, a model training apparatus 1300 is provided. The apparatus include includes a sample obtaining module 1301, a determining module 1302, a construction module 1303, an output module 1304, and a model parameter adjustment module 1305.

The sample obtaining module 1301 is configured to obtain a video frame sample, sample annotation information corresponding to the video frame sample, and standard affine transformation information corresponding to the video frame sample.

The determining module 1302 is configured to input the video frame sample into a target segmentation model for training, and determine predicted affine transformation information corresponding to the video frame sample by using the target segmentation model.

The construction module 1303 is configured to construct an affine loss function according to the predicted affine transformation information and the standard affine transformation information.

The output module 1304 is configured to output predicted affine transformation difference information corresponding to the video frame sample and a predicted segmentation result corresponding to a target in the video frame sample by using the target segmentation model.

The determining module 1302 is further configured to determine standard affine transformation difference information according to a difference between the predicted affine transformation information and the standard affine transformation information.

The construction module 1303 is further configured to construct an affine transformation information revision loss function according to the standard affine transformation difference information and the predicted affine transformation difference information.

The construction module 1303 is further configured to determine a segmentation loss function according to the predicted segmentation result and the sample annotation information.

The model parameter adjustment module 1305 is configured to adjust, according to the affine loss function, the affine transformation information revision loss function, and the segmentation loss function, model parameters of the target segmentation model and continue training the model until a training stop condition is met.

In an embodiment, the sample obtaining module 1301 is further configured to obtain the video frame sample and the corresponding sample annotation information, the sample annotation information including sample key point position information and sample region position information; determine a template image and template key point position information corresponding to the template image according to the video frame sample, the sample key point position information, and the sample region position information; and obtain the standard affine transformation information corresponding to the video frame sample by calculation according to the sample key point position information and the template key point position information.

In an embodiment, the sample obtaining module 1301 is further configured to obtain a first video frame sample and a second video frame sample, the first video frame sample being a previous video frame of the second video frame sample; and obtain sample annotation information respectively corresponding to the first video frame sample and the second video frame sample, and standard affine transformation information corresponding to the first video frame sample. The determining module 1302 is further configured to input the first video frame sample and the second video frame sample into a target segmentation model as a sample pair for training, and process the first video frame sample by using the target segmentation model to obtain predicted affine transformation information corresponding to the first video frame sample. The output module 1304 is further configured to perform affine transformation on the first video frame sample according to the predicted affine transformation information to obtain a first sample candidate region image, and perform feature extraction on the first sample candidate region image to obtain a first sample feature map; perform semantic segmentation based on the first sample feature map to obtain a predicted segmentation result corresponding to a target in the first video frame sample; and revise the predicted affine transformation information according to the first sample feature map to obtain predicted affine transformation difference information corresponding to the first video frame sample. The model training apparatus further includes an adversarial module 1306, configured to determine corresponding optical flow information according to the first video frame sample and the second video frame sample, and determine an optical flow feature map according to the optical flow information and the first sample feature map; use the optical flow feature map and a second sample feature map as a sample input of a discriminator in the target segmentation model, and classify the sample input by using the discriminator to obtain a predicted category of the sample input. The construction module 1303 is further configured to construct an adversarial loss function according to the predicted category and reference categories corresponding to the sample input; and construct the segmentation loss function according to the optical flow feature map, the second sample feature map, and a reference feature map, the reference feature map being a feature map obtained by performing feature extraction on a target in the second video frame sample. The model parameter adjustment module 1305 is further configured to adjust, according to the affine loss function, the affine transformation information revision loss function, the adversarial loss function, and the segmentation loss function, the model parameters of the target segmentation model and continue training the model until the training stop condition is met.

According to the foregoing model training apparatus, in the model training process, affine transformation control information, that is, standard affine transformation information, is introduced to improve the accuracy of orientation prediction. In addition, revision training can be performed on predicted affine transformation information to reduce the segmentation error caused by incorrect positioning. In the training, an affine loss function, an affine transformation information revision loss function, and a segmentation loss function are superimposed and optimized together, so that various parts influence each other and improve each other in the training process. Accordingly, the target segmentation model obtained by training has accurate video semantic segmentation performance.

Figure 15:
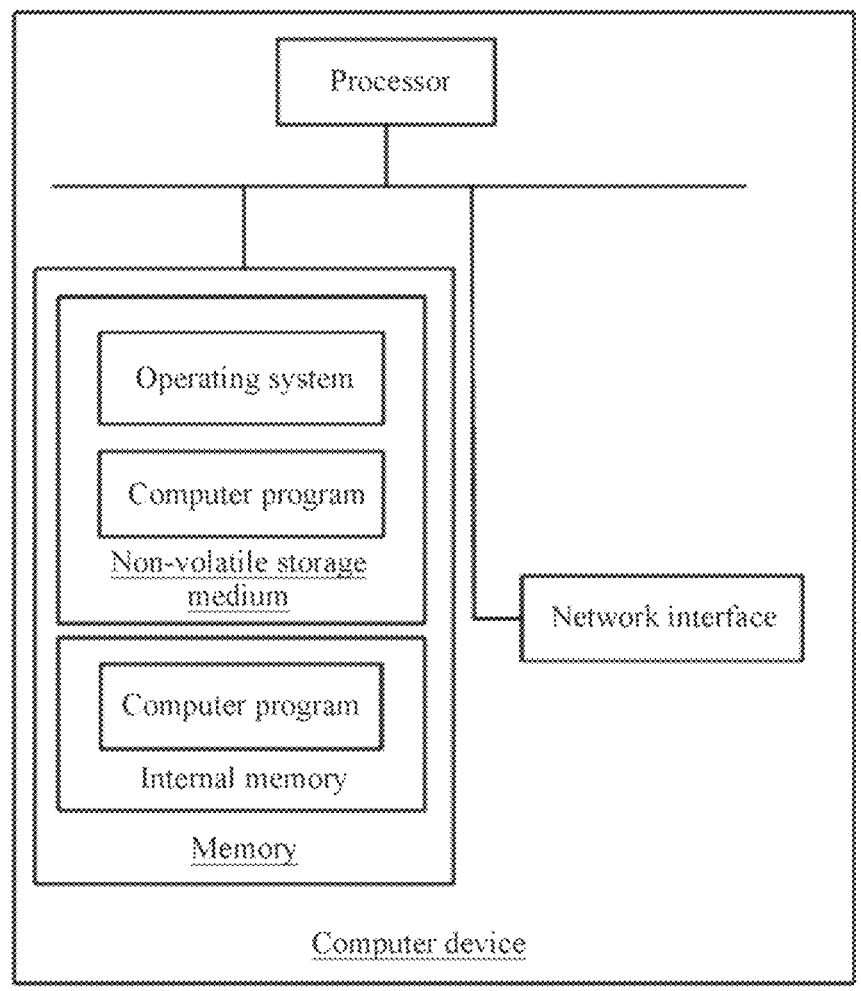
FIG. 15 is a structural block diagram of a computer device according to an embodiment.

FIG. 15 is a diagram of an internal structure of a computer device according to an embodiment. The computer device may be the computer device shown in FIG. 1. As shown in FIG. 15, the computer device includes a processor, a memory, and a network interface connected by a system bus. The memory includes a non-volatile storage medium and an internal memory. The non-volatile storage medium of the computer device stores an operating system and may further store a computer program, where the computer program, when executed by the processor, may cause the processor to implement the image segmentation method and/or model training method. The internal memory may also store a computer program, where the computer program, when executed by the processor, may cause the processor to perform the image segmentation method and/or model training method.

A person skilled in the art may understand that the structure shown in FIG. 15 is only a block diagram of a part of a structure related to a solution of this application and does not limit the computer device to which the solution of this application is applied. The computer device may include more or fewer components than those in the drawings, or some components are combined, or a different component deployment is used.

In an embodiment, the image segmentation apparatus and/or model training apparatus provided in this application may be implemented in the form of a computer program, and the computer program may be run on the computer device shown in FIG. 15. The memory of the computer device may store various program modules that form the image segmentation apparatus, such as an obtaining module, an affine transformation module, a feature extraction module, a semantic segmentation module, and a parameter revision module shown in FIG. 12. A computer program formed by the program modules causes the processor to perform steps in the image segmentation method in the embodiments of this application described in this specification. In another example, program modules that form the image segmentation apparatus include a sample obtaining module, a determining module, a construction module, an output module, and a model parameter adjustment module shown in FIG. 14. The computer program formed by the program modules causes the processor to perform steps in the model training method in embodiments of this application described in this specification.

For example, the computer device shown in FIG. 15 may perform step S202 by using the obtaining module in the image segmentation apparatus shown in FIG. 12. The computer device may perform step S204 by using the affine transformation module. The computer device may perform step S206 by using the feature extraction module. The computer device may perform step S208 by using the semantic segmentation module. The computer device may perform step S210 by using the parameter revision module.

The term module, and other similar terms such as subunit, unit, submodule, etc., in this disclosure may refer to a software unit, a hardware unit, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each unit can be part of an overall module that includes the functionalities of the module.

In an embodiment, a computer device is provided, including a memory and a processor, the memory storing a computer program, the computer program, when executed by the processor, causing the processor to perform steps of the image segmentation method and/or model training method. The steps of the image segmentation method and/or model training method may be the steps of the image segmentation method and/or model training method in the foregoing embodiments.

In an embodiment, a computer-readable storage medium is provided, storing a computer program, the computer program, when executed by a processor, causing the processor to perform steps of the image segmentation method and/or model training method. The steps of the image segmentation method and/or model training method may be the steps of the image segmentation method and/or model training method in the foregoing embodiments.

A person of ordinary skill in the art may understand that all or some of procedures of the method in the foregoing embodiments may be implemented by a computer program instructing relevant hardware. The program may be stored in a non-volatile computer-readable storage medium. When the program is executed, the procedures of the foregoing method embodiments may be implemented. References to the memory, the storage, the database, or other medium used in the embodiments provided in this application may all include a non-volatile or a volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include a RAM or an external cache. By way of description rather than limitation, the RAM may be obtained in a plurality of forms, such as a static RAM (SRAM), a dynamic RAM (DRAM), a synchronous DRAM (SDRAM), a double data rate SDRAM (DDRSDRAM), an enhanced SDRAM (ESDRAM), a synchlink (Synchlink) DRAM (SLDRAM), a rambus (Rambus) direct RAM (RDRAM), a direct rambus dynamic RAM (DRDRAM), and a rambus dynamic RAM (RDRAM).

Technical features of the foregoing embodiments may be randomly combined. To make description concise, not all possible combinations of the technical features in the foregoing embodiments are described. However, the combinations of these technical features shall be considered as falling within the scope recorded by this specification provided that no conflict exists.

The foregoing embodiments show only several implementations of this application and are described in detail, which, however, are not to be construed as a limitation to the patent scope of this application. For a person of ordinary skill in the art, several transformations and improvements can be made without departing from the idea of this application. These transformations and improvements belong to the protection scope of this application. Therefore, the protection scope of this application shall be subject to the protection scope of the appended claims.

What is claimed is:

1. An image segmentation method, applicable to a computer device, the method comprising:
    obtaining a current frame and historical affine transformation information of a previous video frame in a video frame sequence, wherein the historical affine transformation information of the previous video frame includes parameters obtained from an image segmentation processing of the previous video frame and revised for affine transformation of the current frame;
    performing the affine transformation on the current frame according to the historical affine transformation information to obtain a candidate region image corresponding to the current frame;
    performing feature extraction on the candidate region image to obtain a feature map corresponding to the candidate region image;
    performing semantic segmentation based on the feature map to obtain a segmentation result corresponding to a target in the current frame; and
    revising the historical affine transformation information according to the feature map to obtain updated affine transformation information, and using the updated affine transformation information as historical affine transformation information corresponding to a subsequent video frame in the video frame sequence.

2. The method according to claim 1, wherein the revising the historical affine transformation information according to the feature map to obtain updated affine transformation information, and using the updated affine transformation information as historical affine transformation information corresponding to a subsequent video frame in the video frame sequence comprises:
    processing the feature map by using a second fully connected network, and outputting an affine transformation difference result via at least one output channel of the second fully connected network;
    obtaining updated affine transformation information by calculation according to the affine transformation difference result and the historical affine transformation information of the previous video frame; and
    using the updated affine transformation information as the historical affine transformation information corresponding to the subsequent video frame in the video frame sequence.

3. The method according to claim 1, wherein the feature map fuses with optical flow information contained in the video frame sequence.

4. The method according to claim 1, wherein the obtaining a current frame and historical affine transformation information of a previous video frame in a video frame sequence comprises:

obtaining, when the current frame is an initial video frame, the initial video frame in the video frame sequence;
extracting an image feature of the initial video frame by using a first convolutional neural network (CNN);
inputting the image feature into a first fully connected network, processing the image feature by using the first fully connected network, and outputting affine transformation information via at least one output channel of the first fully connected network; and
using the outputted affine transformation information as historical affine transformation information corresponding to the initial video frame.

5. The method according to claim 1, wherein the performing semantic segmentation based on the feature map to obtain a segmentation result corresponding to a target in the current frame comprises:
upsampling the feature map by using a fully convolutional neural network (FCN) to obtain an intermediate image;
performing pixel-level classification on each pixel in the intermediate image by using the FCN to obtain categories corresponding to pixels; and
outputting the segmentation result of semantic segmentation on the target in the current frame according to the categories corresponding to the pixels.

6. The method according to claim 5, wherein the outputting the segmentation result of semantic segmentation on the target in the current frame according to the categories corresponding to the pixels comprises:
determining pixels belonging to a target category in the intermediate image; and
segmenting the intermediate image to obtain a target segmentation region that is composed of the pixels belonging to the target category and that comprises the target.

7. The method according to claim 1, wherein the method is performed by using a target segmentation model;
the performing feature extraction on the candidate region image to obtain a feature map corresponding to the candidate region image comprises:
performing feature extraction on the candidate region image by using a second CNN in the target segmentation model to obtain the feature map corresponding to the candidate region image;
the performing semantic segmentation based on the feature map to obtain a segmentation result corresponding to a target in the current frame comprises:
performing semantic segmentation on the feature map by using an FCN in the target segmentation model to obtain the segmentation result corresponding to the target in the current frame; and
the revising the historical affine transformation information according to the feature map to obtain updated affine transformation information comprises:
revising the historical affine transformation information by using a second fully connected network in the target segmentation model to obtain the updated affine transformation information.

8. The method according to claim 1, wherein the method is performed by using a target segmentation model, and training operations of the target segmentation model comprises:
obtaining a video frame sample, sample annotation information corresponding to the video frame sample, and standard affine transformation information corresponding to the video frame sample;
inputting the video frame sample into the target segmentation model for training, and determining predicted affine transformation information corresponding to the video frame sample by using the target segmentation model;
constructing an affine loss function according to the predicted affine transformation information and the standard affine transformation information;
outputting predicted affine transformation difference information corresponding to the video frame sample and a predicted segmentation result corresponding to a target in the video frame sample by using the target segmentation model;
determining standard affine transformation difference information according to a difference between the predicted affine transformation information and the standard affine transformation information;
constructing an affine transformation information revision loss function according to the standard affine transformation difference information and the predicted affine transformation difference information;
determining a segmentation loss function according to the predicted segmentation result and the sample annotation information; and
adjusting, according to the affine loss function, the affine transformation information revision loss function, and the segmentation loss function, model parameters of the target segmentation model and continuing training the model until a training stop condition is met.

9. The method according to claim 8, wherein the obtaining a video frame sample, sample annotation information corresponding to the video frame sample, and standard affine transformation information corresponding to the video frame sample comprises:
obtaining the video frame sample and the corresponding sample annotation information, the sample annotation information comprising sample key point position information and sample region position information;
determining a template image and template key point position information corresponding to the template image according to the video frame sample, the sample key point position information, and the sample region position information; and
obtaining the standard affine transformation information corresponding to the video frame sample by calculation according to the sample key point position information and the template key point position information.

10. The method according to claim 8, wherein the obtaining a video frame sample, sample annotation information corresponding to the video frame sample, and standard affine transformation information corresponding to the video frame sample comprises:
obtaining a first video frame sample and a second video frame sample, the first video frame sample being a previous video frame of the second video frame sample; and
obtaining sample annotation information respectively corresponding to the first video frame sample and the second video frame sample, and standard affine transformation information corresponding to the first video frame sample;
the inputting the video frame sample into the target segmentation model for training, and determining predicted affine transformation information corresponding to the video frame sample by using the target segmentation model comprises:

inputting the first video frame sample and the second video frame sample into a target segmentation model as a sample pair for training, and processing the first video frame sample by using the target segmentation model to obtain predicted affine transformation information corresponding to the first video frame sample; and the outputting predicted affine transformation difference information corresponding to the video frame sample and a predicted segmentation result corresponding to a target in the video frame sample by using the target segmentation model comprises:

performing affine transformation on the first video frame sample according to the predicted affine transformation information to obtain a first sample candidate region image, and performing feature extraction on the first sample candidate region image to obtain a first sample feature map;

performing semantic segmentation based on the first sample feature map to obtain a predicted segmentation result corresponding to a target in the first video frame sample; and revising the predicted affine transformation information according to the first sample feature map to obtain predicted affine transformation difference information corresponding to the first video frame sample.

11. The method according to claim 10, wherein the method further comprises:

determining corresponding optical flow information according to the first video frame sample and the second video frame sample, and determining an optical flow feature map according to the optical flow information and the first sample feature map;

using the optical flow feature map and a second sample feature map as a sample input of a discriminator in the target segmentation model, and classifying the sample input by using the discriminator to obtain a predicted category of the sample input; and constructing an adversarial loss function according to the predicted category and reference categories corresponding to the sample input;

the determining a segmentation loss function according to the predicted segmentation result and the sample annotation information comprises:

constructing the segmentation loss function according to the optical flow feature map, the second sample feature map, and a reference feature map, the reference feature map being a feature map obtained by performing feature extraction on a target in the second video frame sample; and the adjusting, according to the affine loss function, the affine transformation information revision loss function, and the segmentation loss function, model parameters of the target segmentation model and continuing training the model until a training stop condition is met comprises:

adjusting, according to the affine loss function, the affine transformation information revision loss function, the adversarial loss function, and the segmentation loss function, the model parameters of the target segmentation model and continuing training the model until the training stop condition is met.

12. An image segmentation apparatus, comprising at least one memory and at least one processor, the at least one memory storing a computer program, the computer program, when executed by the at least one processor, causing the at least one processor to:

obtain a current frame and historical affine transformation information of a previous video frame in a video frame sequence, wherein the historical affine transformation information of the previous video frame includes parameters obtained from an image segmentation processing of the previous video frame and revised for affine transformation of the current frame;

perform the affine transformation on the current frame according to the historical affine transformation information to obtain a candidate region image corresponding to the current frame;

perform feature extraction on the candidate region image to obtain a feature map corresponding to the candidate region image;

perform semantic segmentation based on the feature map to obtain a segmentation result corresponding to a target in the current frame; and revise the historical affine transformation information according to the feature map to obtain updated affine transformation information, and use the updated affine transformation information as historical affine transformation information corresponding to a subsequent video frame in the video frame sequence.

13. The apparatus according to claim 12, wherein the at least one processor is further configured to process the feature map by using a second fully connected network, and output an affine transformation difference result via at least one output channel of the second fully connected network; obtain updated affine transformation information of the current frame by calculation according to the affine transformation difference result and the historical affine transformation information of the previous video frame; and use the updated affine transformation information as the historical affine transformation information corresponding to the subsequent video frame in the video frame sequence.

14. The apparatus according to claim 12, wherein the feature map fuses with optical flow information contained in the video frame sequence.

15. The apparatus according to claim 12, wherein when training the target segmentation model, the at least one processor is further configured to:

obtain a video frame sample, sample annotation information corresponding to the video frame sample, and standard affine transformation information corresponding to the video frame sample;

input the video frame sample into a target segmentation model for training, and determine predicted affine transformation information corresponding to the video frame sample by using the target segmentation model;

construct an affine loss function according to the predicted affine transformation information and the standard affine transformation information;

output predicted affine transformation difference information corresponding to the video frame sample and a predicted segmentation result corresponding to a target in the video frame sample by using the target segmentation model;

determine standard affine transformation difference information according to a difference between the predicted affine transformation information and the standard affine transformation information;

construct an affine transformation information revision loss function according to the standard affine transformation difference information and the predicted affine transformation difference information;

determine a segmentation loss function according to the predicted segmentation result and the sample annotation information; and adjust, according to the affine loss function, the affine transformation information revision loss function, and the segmentation loss function, model parameters of the target segmentation model and continue training the model until a training stop condition is met.

16. A non-transitory computer-readable storage medium, storing a computer program, the computer program, when executed by at least one processor, causing the at least one processor to perform the operations of the method comprising:

obtaining a current frame and historical affine transformation information of a previous video frame in a video frame sequence, wherein the historical affine transformation information of the previous video frame includes parameters obtained from an image segmentation processing of the previous video frame and revised for affine transformation of the current frame;

performing the affine transformation on the current frame according to the historical affine transformation information to obtain a candidate region image corresponding to the current frame;

performing feature extraction on the candidate region image to obtain a feature map corresponding to the candidate region image;

performing semantic segmentation based on the feature map to obtain a segmentation result corresponding to a target in the current frame; and revising the historical affine transformation information according to the feature map to obtain updated affine transformation information, and using the updated affine transformation information as historical affine transformation information corresponding to a subsequent video frame in the video frame sequence.

17. The non-transitory computer-readable storage medium according to claim 16, wherein the revising the historical affine transformation information according to the feature map to obtain updated affine transformation information, and using the updated affine transformation information as historical affine transformation information corresponding to a subsequent video frame in the video frame sequence comprises:

processing the feature map by using a second fully connected network, and outputting an affine transformation difference result via at least one output channel of the second fully connected network;

obtaining updated affine transformation information by calculation according to the affine transformation difference result and the historical affine transformation information of the previous video frame; and using the updated affine transformation information as the historical affine transformation information corresponding to the subsequent video frame in the video frame sequence.

18. The non-transitory computer-readable storage medium according to claim 16, wherein the feature map fuses with optical flow information contained in the video frame sequence.

19. The non-transitory computer-readable storage medium according to claim 16, wherein the obtaining a current frame and historical affine transformation information of a previous video frame in a video frame sequence comprises:

obtaining, when the current frame is an initial video frame, the initial video frame in the video frame sequence;

extracting an image feature of the initial video frame by using a first convolutional neural network (CNN);

inputting the image feature into a first fully connected network, processing the image feature by using the first fully connected network, and outputting affine transformation information via at least one output channel of the first fully connected network; and using the outputted affine transformation information as historical affine transformation information corresponding to the initial video frame.

20. The non-transitory computer-readable storage medium according to claim 16, wherein the performing semantic segmentation based on the feature map to obtain a segmentation result corresponding to a target in the current frame comprises:

upsampling the feature map by using a fully convolutional neural network (FCN) to obtain an intermediate image;

performing pixel-level classification on each pixel in the intermediate image by using the FCN to obtain categories corresponding to pixels; and outputting the segmentation result of semantic segmentation on the target in the current frame according to the categories corresponding to the pixels.

* * * * *